US011797956B1

(12) United States Patent
Fakhraie et al.

(10) Patent No.: US 11,797,956 B1
(45) Date of Patent: Oct. 24, 2023

(54) THIRD-PARTY PAYMENT INTERFACES

(71) Applicant: Wells Fargo Bank, N.A., San Francisco, CA (US)

(72) Inventors: Lila Fakhraie, Belmont, CA (US); Jo Anne Graham, Charlotte, NC (US); Andrea Renee Leighton, San Francisco, CA (US); Peter L. Shen, Castro Valley, CA (US); Ravi K. Thota, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/856,316

(22) Filed: Jul. 1, 2022

Related U.S. Application Data

(63) Continuation of application No. 16/214,469, filed on Dec. 10, 2018, now Pat. No. 11,379,850.

(51) Int. Cl.
  *G06Q 20/08* (2012.01)
  *G06F 9/54* (2006.01)
  (Continued)

(52) U.S. Cl.
  CPC ......... *G06Q 20/0855* (2013.01); *G06F 9/451* (2018.02); *G06F 9/547* (2013.01);
  (Continued)

(58) Field of Classification Search
  CPC .... G06Q 20/0855; G06Q 20/40; G06Q 20/42; G06F 9/451; G06F 9/547; H04L 63/0853; H04L 67/53; H04W 84/042
  See application file for complete search history.

(56) References Cited

U.S. PATENT DOCUMENTS 6,347,306 B1  2/2002  Swart
6,721,776 B1  4/2004  Erickson et al.
(Continued)

FOREIGN PATENT DOCUMENTS

WO  WO-2010/085370      7/2010
WO  WO-2017/160877 A1  9/2017
WO  WO-2017/181185 A1  10/2017

OTHER PUBLICATIONS

Wells Fargo Bank NA Granted Patent for Identity Verification Services with Identity Score Through External Entities via Application Programming Interface, Apr. 14, 2020, Global IP News. Banking Patent News, New Delhi. (Year: 2020).*

(Continued)

*Primary Examiner* — Scott C Anderson
*Assistant Examiner* — George N. Proios
(74) *Attorney, Agent, or Firm* — Foley & Lardner LLP

(57) ABSTRACT

Disclosed are example methods, systems, and devices for integrating payment API services provided by a service provider computing system with a client application. The client application running on a user device may allow a user to make payments and/or to submit payments for approval and may communicate payment information to a client computing system. If a payment is submitted for approval via the client application, the client computing system may make API calls to the service provider computing system to, for example, submit, view, and/or cancel payments. Payments may be approved by a second user using a second device. The service provider computing system initiates fund transfers for approved payments. Payments may be submitted within the operating environment of the client application without use of an application or website of the service provider.

20 Claims, 11 Drawing Sheets

(51) Int. Cl.
*G06Q 20/40* (2012.01)
*G06F 9/451* (2018.01)
*H04L 67/53* (2022.01)
*G06Q 20/42* (2012.01)
*H04L 9/40* (2022.01)
*H04W 84/04* (2009.01)

(52) U.S. Cl.
CPC ............. *G06Q 20/40* (2013.01); *G06Q 20/42* (2013.01); *H04L 63/0853* (2013.01); *H04L 67/53* (2022.05); *H04W 84/042* (2013.01)

(56) References Cited

U.S. PATENT DOCUMENTS

| | | |
|---|---|---|
| 7,249,097 B2 | 7/2007 | Hutchison et al. |
| 7,356,506 B2 | 4/2008 | Watson et al. |
| 7,444,676 B1 | 10/2008 | Asghari-Kamrani et al. |
| 7,523,068 B2 | 4/2009 | Britney et al. |
| 7,536,326 B2 | 5/2009 | Tyson-Quah |
| 7,610,233 B1 | 10/2009 | Leong et al. |
| 7,725,875 B2 | 5/2010 | Waldrep |
| 7,729,994 B2 | 6/2010 | Gupta et al. |
| 7,831,521 B1 | 11/2010 | Ball et al. |
| 7,870,078 B2 | 1/2011 | Clark et al. |
| 7,890,393 B2 | 2/2011 | Talbert et al. |
| 8,301,500 B2 | 10/2012 | Pharris |
| 8,352,323 B2 | 1/2013 | Fisher |
| 8,352,370 B1 | 1/2013 | White et al. |
| 8,412,625 B2 | 4/2013 | Pilo' |
| 8,452,708 B1 | 5/2013 | Birenbaum et al. |
| 8,453,925 B2 | 6/2013 | Fisher et al. |
| 8,527,408 B2 | 9/2013 | Campbell et al. |
| 8,606,670 B2 | 12/2013 | Patton |
| 8,745,194 B2 | 6/2014 | Uribe-Etxebarria Jimenez |
| 8,818,870 B2 | 8/2014 | Fisher |
| 8,838,503 B2 | 9/2014 | Pelegero |
| 9,135,618 B1 | 9/2015 | Dorsey et al. |
| 9,219,736 B1* | 12/2015 | Lewis ..................... H04L 67/22 |
| 9,225,707 B1 | 12/2015 | De Sousa et al. |
| 9,378,356 B2 | 6/2016 | Rockwell |
| 9,471,913 B1 | 10/2016 | Kaptcan et al. |
| 9,495,699 B2 | 11/2016 | Mangaru et al. |
| 9,525,690 B2 | 12/2016 | Burgess et al. |
| 9,542,673 B2 | 1/2017 | Tanner et al. |
| 9,589,268 B2 | 3/2017 | Hammad |
| 9,633,341 B2 | 4/2017 | Kim et al. |
| 9,646,297 B2 | 5/2017 | Van Den Broeck et al. |
| 9,665,854 B1 | 5/2017 | Burger et al. |
| 9,705,999 B1* | 7/2017 | Lewis ............... G06F 16/24575 |
| 9,779,436 B2 | 10/2017 | Bui |
| 9,830,606 B2 | 11/2017 | Boncimino |
| 9,846,872 B2 | 12/2017 | Hogg et al. |
| 9,876,803 B2 | 1/2018 | Miu et al. |
| 9,892,386 B2 | 2/2018 | Liberty |
| 9,922,381 B2* | 3/2018 | Isaacson ............ G06Q 30/0635 |
| 9,990,621 B1 | 6/2018 | Ng et al. |
| 10,055,740 B2 | 8/2018 | Hanson et al. |
| 10,062,072 B2 | 8/2018 | Davis et al. |
| 10,062,073 B2 | 8/2018 | Baldie |
| 10,068,295 B1 | 9/2018 | Allen |
| 10,073,953 B2 | 9/2018 | Xing |
| 10,083,427 B2 | 9/2018 | Cummins et al. |
| 10,089,617 B2 | 10/2018 | Royyuru et al. |
| 10,121,129 B2 | 11/2018 | Kalgi |
| 10,121,133 B2 | 11/2018 | Nelms et al. |
| 10,127,528 B2 | 11/2018 | Solis |
| 10,127,549 B2 | 11/2018 | Keresman et al. |
| 10,148,659 B2 | 12/2018 | Nandakumar |
| 10,157,375 B2 | 12/2018 | Balasubramanian et al. |
| 10,163,086 B2 | 12/2018 | Keresman et al. |
| 10,181,119 B2 | 1/2019 | Cyr et al. |
| 10,181,162 B2 | 1/2019 | Drury et al. |
| 10,185,954 B2 | 1/2019 | Mizhen et al. |
| 10,210,345 B2 | 2/2019 | Beye et al. |
| 10,210,514 B2 | 2/2019 | Musser et al. |
| 10,354,240 B2 | 7/2019 | Purves et al. |
| 10,362,010 B2 | 7/2019 | Sharp et al. |
| 10,467,689 B2 | 11/2019 | Chen |
| 10,510,082 B1 | 12/2019 | Zimmerman et al. |
| 10,621,658 B1* | 4/2020 | Sahni ..................... G06Q 30/06 |
| 10,708,054 B2 | 7/2020 | Donaldson et al. |
| 11,044,092 B1 | 6/2021 | Freeling et al. |
| 11,044,246 B1 | 6/2021 | Freeling et al. |
| 11,050,565 B1 | 6/2021 | Freeling et al. |
| 11,354,673 B1 | 6/2022 | Brock |
| 11,429,971 B1 | 8/2022 | Ouellette et al. |
| 2002/0181710 A1 | 12/2002 | Adam et al. |
| 2004/0177047 A1 | 9/2004 | Graves et al. |
| 2005/0262026 A1 | 11/2005 | Watkins |
| 2006/0059569 A1 | 3/2006 | Dasgupta et al. |
| 2006/0129896 A1 | 6/2006 | Rohn |
| 2006/0277128 A1 | 12/2006 | Anandarao et al. |
| 2007/0271149 A1 | 11/2007 | Siegel et al. |
| 2007/0288377 A1 | 12/2007 | Shaked |
| 2008/0052183 A1 | 2/2008 | Hobson et al. |
| 2008/0086417 A1 | 4/2008 | Bykov et al. |
| 2008/0167944 A1 | 7/2008 | Keithley et al. |
| 2008/0288405 A1 | 11/2008 | John |
| 2008/0301022 A1 | 12/2008 | Patel et al. |
| 2009/0043667 A1 | 2/2009 | Deyoe et al. |
| 2009/0076934 A1 | 3/2009 | Shahbazi et al. |
| 2009/0089190 A1 | 4/2009 | Girulat, Jr. |
| 2009/0249448 A1 | 10/2009 | Choi et al. |
| 2009/0320106 A1 | 12/2009 | Jones et al. |
| 2010/0094719 A1 | 4/2010 | Sines et al. |
| 2010/0169223 A1 | 7/2010 | Yuan |
| 2011/0137804 A1 | 6/2011 | Peterson |
| 2011/0270751 A1 | 11/2011 | Csinger et al. |
| 2012/0198535 A1 | 8/2012 | Oberheide et al. |
| 2013/0013512 A1 | 1/2013 | Cloud et al. |
| 2013/0103578 A1 | 4/2013 | Mallean et al. |
| 2013/0117832 A1 | 5/2013 | Gandhi et al. |
| 2013/0179957 A1 | 7/2013 | Takata et al. |
| 2013/0198066 A1 | 8/2013 | Wall et al. |
| 2013/0276078 A1 | 10/2013 | Rockwell |
| 2013/0339231 A1 | 12/2013 | Chaitanya |
| 2013/0346302 A1 | 12/2013 | Purves et al. |
| 2014/0129435 A1 | 5/2014 | Pardo et al. |
| 2014/0223578 A1 | 8/2014 | Ross |
| 2014/0256425 A1 | 9/2014 | Flaherty |
| 2014/0258046 A1 | 9/2014 | Wendling et al. |
| 2014/0258136 A1 | 9/2014 | Ellis |
| 2014/0279546 A1 | 9/2014 | Poole et al. |
| 2014/0324690 A1 | 10/2014 | Allen et al. |
| 2014/0359722 A1 | 12/2014 | Schultz et al. |
| 2015/0019423 A1 | 1/2015 | Dowling et al. |
| 2015/0026061 A1 | 1/2015 | Siegel et al. |
| 2015/0039452 A1 | 2/2015 | Barve et al. |
| 2015/0052005 A1 | 2/2015 | Howe |
| 2015/0058931 A1 | 2/2015 | Miu et al. |
| 2015/0074407 A1 | 3/2015 | Palmeri et al. |
| 2015/0089409 A1 | 3/2015 | Asseily et al. |
| 2015/0089615 A1 | 3/2015 | Krawczyk et al. |
| 2015/0121462 A1 | 4/2015 | Courage et al. |
| 2015/0154588 A1 | 6/2015 | Purves et al. |
| 2015/0161608 A1 | 6/2015 | Gilbert et al. |
| 2015/0188900 A1 | 7/2015 | Charbonneau et al. |
| 2015/0188915 A1 | 7/2015 | Li |
| 2015/0242834 A1 | 8/2015 | Goldsmith et al. |
| 2015/0242949 A1 | 8/2015 | Phillips, IV |
| 2015/0278811 A1 | 10/2015 | Lalchandani et al. |
| 2015/0310497 A1 | 10/2015 | Valin et al. |
| 2015/0363581 A1 | 12/2015 | Ranadive et al. |
| 2015/0371226 A1 | 12/2015 | Hurley et al. |
| 2016/0005113 A1 | 1/2016 | Mendez et al. |
| 2016/0012465 A1 | 1/2016 | Sharp |
| 2016/0019536 A1 | 1/2016 | Ortiz et al. |
| 2016/0132877 A1 | 5/2016 | Carrott |
| 2016/0189145 A1 | 6/2016 | William |
| 2016/0267449 A1* | 9/2016 | Forzley .............. G06Q 30/0239 |
| 2017/0004719 A1 | 1/2017 | Laud et al. |
| 2017/0024716 A1 | 1/2017 | Jiam et al. |
| 2017/0070500 A1 | 3/2017 | Hockey et al. |
| 2017/0076274 A1* | 3/2017 | Royyuru ................. G06Q 20/18 |

(56) References Cited

U.S. PATENT DOCUMENTS

| | | |
|---|---|---|
| 2017/0126649 A1 | 5/2017 | Votaw et al. |
| 2017/0180960 A1 | 6/2017 | Drake |
| 2017/0286958 A1 | 10/2017 | Herman |
| 2017/0289140 A1 | 10/2017 | Cai et al. |
| 2017/0308880 A1 | 10/2017 | Phillips et al. |
| 2017/0310771 A1* | 10/2017 | Lewis ............... H04L 67/22 |
| 2017/0351514 A1 | 12/2017 | Chou et al. |
| 2017/0372275 A1 | 12/2017 | Sigmund |
| 2018/0025333 A1 | 1/2018 | Cunningham |
| 2018/0060965 A1 | 3/2018 | Kumar |
| 2018/0068312 A1 | 3/2018 | Kim et al. |
| 2018/0121896 A1 | 5/2018 | Potadar |
| 2018/0130051 A1 | 5/2018 | Matthews et al. |
| 2018/0139109 A1 | 5/2018 | Zuerner |
| 2018/0150823 A1 | 5/2018 | Omojola et al. |
| 2018/0150826 A1 | 5/2018 | Schwartz et al. |
| 2018/0165659 A1 | 6/2018 | Raouda El-Balah |
| 2018/0189777 A1* | 7/2018 | Grassadonia ......... G06Q 20/363 |
| 2018/0189778 A1 | 7/2018 | Grassadonia et al. |
| 2018/0198845 A1 | 7/2018 | Kulp et al. |
| 2018/0225789 A1 | 8/2018 | Cook |
| 2018/0240095 A1 | 8/2018 | Buckley et al. |
| 2018/0247654 A1 | 8/2018 | Bhaya et al. |
| 2018/0253727 A1 | 9/2018 | Ortiz et al. |
| 2018/0267847 A1* | 9/2018 | Smith ............... G06Q 20/1085 |
| 2018/0276053 A1 | 9/2018 | Kesavan et al. |
| 2018/0315024 A1 | 11/2018 | Rauch et al. |
| 2018/0349891 A1 | 12/2018 | Putre et al. |
| 2019/0005467 A1 | 1/2019 | Varagani et al. |
| 2019/0012646 A1 | 1/2019 | Seidl et al. |
| 2019/0034393 A1 | 1/2019 | Rose |
| 2019/0043138 A1 | 2/2019 | Blake et al. |
| 2019/0050845 A1 | 2/2019 | Deshmukh et al. |
| 2019/0058707 A1 | 2/2019 | Chung et al. |
| 2019/0066090 A1 | 2/2019 | Mei et al. |
| 2019/0087809 A1 | 3/2019 | Bloy et al. |
| 2019/0087894 A1 | 3/2019 | Bloy et al. |
| 2019/0096005 A1* | 3/2019 | Drury ............... G06Q 20/40 |
| 2019/0205851 A1 | 7/2019 | Sinha et al. |
| 2019/0244263 A1 | 8/2019 | Nelson et al. |
| 2019/0281051 A1 | 9/2019 | Burmester et al. |
| 2019/0303910 A1 | 10/2019 | Asbe et al. |
| 2019/0312746 A1 | 10/2019 | Myers et al. |
| 2019/0318122 A1* | 10/2019 | Hockey ............... H04L 63/102 |
| 2020/0053061 A1 | 2/2020 | Cambou |
| 2020/0092108 A1 | 3/2020 | Lyu |
| 2021/0224767 A1 | 7/2021 | DeVan et al. |

OTHER PUBLICATIONS

Authentication and Access to Financial Institution Services and System, Aug. 11, 2021, Federal Financial Institution Examination Council. (Year: 2021).*

Zachariadis, M., et al. The API economy and digital transformation in financial services: The case of open banking. Swift Institute Working Paper No. 2016-001. Jun. 15, 2017. (Year: 2017).

Bonneau, Joseph and Soren Preibusch. "The Password Thicket: Technical and Market Failures in Human Authentication on the Web." The Ninth Workshop on the Economics of Information Security. Weis. 2010. (Year: 2010).

Byambajav, Dolgorsuren; "Secure NFC enabled mobile phone payments using elliptic curve cryptography"; California State University, Aug. 2011. (Year: 2011).

Multibiometric Techniques and standards Activities, Rick Lazarick (Year: 2005).

Using Haptic Interfaces for User Verification in Virtual Environments Orozco (Year: 2008).

V. Toubiana, V. Verdot, G. Burnside and E. Joubert, "R2M: A Reputation Model for Mashups," 2010 7th IEEE Consumer Communications and Networking Conference, 2010, pp. 1-6, doi: 10.1109/CCNC.2010.5421609. (Year: 2010).

Wells Fargo Bank NA Granted Patent for Identity Verification Services with Identity Score Through External Entities via Application Programming Interface Global IP News. Banking Patent News [New Delhi] Apr. 14, 2020. (Year: 2020).

Tiwari, Ayu · Sanyal, Sudip · Abraham, Ajith · Knapskog, Svein Johan· Sanyal, Sugata, A Multi-Factor Security Protocol for Wireless Payment-Secure Web Authentication Using Mobile Devices, Nov. 13, 2011, p. 4 ( Year: 2011) (Year: 2011).

* cited by examiner

THIRD-PARTY PAYMENT INTERFACES

CROSS REFERENCE TO RELATED APPLICATION

This application is a continuation of U.S. patent application Ser. No. 16/214,469 entitled "THIRD-PARTY PAYMENT INTERFACES," filed Dec. 10, 2018, and incorporated herein by reference in its entirety.

TECHNICAL FIELD

The present disclosure relates to systems and methods for integrating payments into third-party applications via application programming interfaces (APIs) and providing multiple users with varying levels of access to perform different tasks using multiple devices.

BACKGROUND

Individuals, businesses, and other account owners often use accounting or other software applications to track revenue and expenses incurred in running a household, a business, etc. The accounts used by the account owners to receive deposits or make payments are often held by a service provider that is separate from the third-party client providing the software application. When an account owner wishes to make a payment to another entity, the account owner launches or uses an unintegrated payment platform (e.g., an application or website of the service provider) that is separate from the application of the third-party client. This requires the account owner to leave the operating environment of the third-party client application in which he or she is managing finances. This also requires the account owner to resubmit information that was already entered at least once into the third-party client application, such as information on payees and payment amounts. This multistep process is inefficient and computationally resource intensive, and it diminishes the user experience and convenience provided by the third-party client application and the application or website of the service provider. For example, an account owner might identify payees and enter owed amounts into the third-party client application, and separately use a service provider application or website and provide information on payees and payment amounts to arrange for payments to be made using an account held by the service provider.

SUMMARY

One embodiment of the disclosure relates to a computing device. The computing device may comprise a network interface configured to communicate data with a client computing system via a telecommunications network. The computing device may also comprise one or more user interfaces configured to receive inputs and visually present graphical user interfaces (GUIs). The computing device may additionally comprise a processor and a memory having stored thereon a client application configured to cause the processor to perform specific functions. The client application may be configured to present, via the one or more user interfaces, a GUI requesting information on a set of one or more payments. The payments may be for initiation by an external service provider computing system that administers funds to be used to make the set of payments. The client application may also be configured to accept from the user, via the one or more user interfaces, the requested information on the set of payments. The client application may moreover be configured to present, via the one or more user interfaces, a visually-perceptible active link. The link may be activatable using the one or more user interfaces to submit the set of payments for approval. The link may be activatable to submit the set the payments for approval via a second computing device of a second user who is registered at the external service provider computing system as having payment approval rights. The client application may additionally be configured to receive a signal from the one or more user interfaces indicating activation of the link. The client application may further be configured to cause the client computing system to make a submit-payment API call to the external service provider computing system. The client application may be configured to cause the client computing system to make the submit-API call in response to receiving the signal. The client application may also be configured to cause the client computing system to make the submit-API call without using an application provided by the external service provider computing system and/or without directing the computing device to a website provided by the external service provider computing system. The submit-payment API call may include a security token, The submit-payment API call may also include payment data identifying the set of payments. The security token may be configured to authenticate the client computing system to the external service provider computing system. The security token may also be configured to identify the user. The client application may furthermore be configured to present, via the one or more user interfaces, a first visually-perceptible display element indicating that the set of payments has been submitted for approval. The client application may be configured to receive, from the client computing system, a status indicating that approval was received at the external service provider computing system. The approval may have been received from the second computing device. The approval may have been received at the service provider computing system. The client computing system may have received the status from the external service provider computing system. The client computing system may have received the status from the external service provider computing system by making a view-payment API call to the external service provider computing system. The external service provider computing system may initiate funds transfers for approved payments. The client application may also be configured to present, via the one or more user interfaces, a second visually-perceptible display element indicating that the set of payments has been approved. The client application may allow the computing device to submit the set of payments for approval from within the operating environment of the client application. The client application may also allow the computing device to submit the set of payments for approval without interacting with an operating environment of an application and/or a website of the external service provider computing system.

Another embodiment of the disclosure relates to a method implemented by a computing device. The method may comprise presenting, via one or more user interfaces, a GUI requesting information on a set of one or more payments. The payments may be for initiation by a service provider computing system that administers funds to be used to make the set of payments. The method may also comprise accepting from a user, via the one or more user interfaces, the requested information on the set of payments. The method may moreover comprise transmitting the information to a client computing system. The method may additionally comprise presenting, via the one or more user interfaces, a visually-perceptible active link that is activatable using the one or more user interfaces. The link may be activatable to submit the set of payments for approval. The method may further comprise receiving a signal from the one or more user interfaces indicating activation of the link. The method may furthermore comprise causing the client computing system to make a submit-payment API call to the service provider computing system. The client computing system may be caused to make the submit-payment API in response to receiving the signal, and may be without use of an application provided by the service provider computing system and/or without directing the computing device to a website provided by the service provider computing system. The submit-payment API call may include a security token. The submit-payment API call may also include payment data identifying the set of payments. The security token may be configured to authenticate the client computing system to the service provider computing system. The security token may alternatively or additionally be configured to identify the user. The method may include presenting, via the one or more user interfaces, a first visually-perceptible display element indicating that the set of payments has been submitted for approval. The method may also include receiving, from the client computing system, a status indicating that approval was received at the external service provider computing system. The client computing system may receive a notification from the service provider computing system when there is a change in the status. The notification may include the latest payment status, or may prompt the client computing system to request or otherwise retrieve the latest payment status from, for example, the service provider computing system. The client computing system may additionally or alternatively receive the status and/or additional information about the payment from the service provider computing system by making a view-payment API call to the service provider computing system. The service provider computing system may initiate funds transfers for approved payments. The method may moreover include presenting, via the one or more user interfaces, a second visually-perceptible display element indicating that the set of payments has been approved. The client application may allow the computing device to submit the set of payments for approval from within the operating environment of the client application. The client application may also allow the computing device to submit the set of payments for approval without interacting with an operating environment of an application and/or a website of the external service provider computing system initiating the payments.

Another embodiment of the disclosure relates to a client computing system. The client computing system may comprise a network interface configured to communicate data via a telecommunications network. The client computing system may also comprise a processor and a memory having stored thereon instructions configured to cause the processor to perform specific functions. The client computing system may be configured to receive, from an external service provider computing system, a security token generated by the service provider computing system. The security token may have been transmitted to the client computing system by the service provider computing system. The security token may have been generated and/or transmitted following approval of a request to integrate payment functionality provided by the service provider computing system into a client application. The client computing system may also be configured to receive, from a computing device running the client application, information on a set of one or more payments. The set of payments may be to be made using funds administered by the service provider computing system. The client application may receive the information via a graphical user interface (GUI) requesting the information. The client computing system may additionally be configured to receive an indication from the computing device that the set of payments is to be submitted for approval. The indication may be transmitted by the computing device in response to activation of a visually-perceptible link presented by the client application. The link may be activatable via one or more user interfaces of the computing device to submit the set of payments for approval. The client computing system may moreover be configured to transmit a submit-payment API call to the service provider computing system. The client computing system may be configured to transmit the submit-payment API call in response to receiving the indication. The submit-payment API call may include the security token. The submit-payment API call may also include payment data identifying the set of payments. The client computing system may further be configured to transmit to the computing device a confirmation that the set of payments have been submitted to the service provider computing system for approval. The client computing system may furthermore be configure to transmit a view-payment API call to the service provider computing system. The client computing system may furthermore be configured to receive from the service provider computing system a status indicating that the set of payments has been approved. The client computing system may furthermore be configured to transmit an update to the client application. The client computing system may be configured to transmit the update in response to receiving the status. The client application may present, via one or more user interfaces, a second visually-perceptible display element indicating that the set of payments has been approved. The client application may allow the computing device to submit the set of payments for approval from within the operating environment of the client application. The client application may allow the computing device to submit the set of payments for approval without interacting with an operating environment of an application and/or a website of the external service provider computing system.

Another embodiment of the disclosure relates to a service provider computing system. The service provider computing system may administer an account to be used for payments submitted by a first computing device. The system may comprise a network interface configured to communicate data with an external third-party client computing system of a third-party client via a telecommunications network. The system may also comprise a processor and a memory having instructions that, when executed by the processor, cause the processor to perform specific functions. The system may be configured to generate a security token unique to a first user of the first computing device. The third-party client computing system may provide a third-party client application to the first computing device of the first user. The system may also be configured to transmit the security token to the third-party client computing system using the network interface. The security token may be stored in a memory of the third-party client computing system for transmission to the service provider computing system to authenticate the third-party client computing system. The system may moreover be configured to accept a submit-payment API call from the third-party client computing system. The submit-payment API call may be transmitted to the service provider computing system in response to an instruction to submit a payment for approval. The instruction to submit a payment for approval may be received from the third-party client application running on the first computing device. The submit-payment API call may include the security token and payment data identifying a payee and a payment amount. The payment may be submitted within the operating environment of the third-party client application. The payment may also be submitted not via an application or web site provided by the service provider computing system. The system may additionally be configured to use the network interface to initiate a secure session with a second computing device. The system may further be configured to transmit payment data identifying the payee and the payment amount. The payment data identifying the payee and the payment amount may be transmitted to the second computing device during the secure session. The system may furthermore be configured to receive approval of the payment. The approval of the payment may be received from the second computing device during the secure session. The system may furthermore be configured to initiate an electronic funds transfer of the payment amount to the payee from the account.

Another embodiment of the disclosure relates to a method implemented by a service provider computing system of a service provider. The method may comprise initiating a first secure session with a first computing device of a first user who is authorized to approve payments. The payments may be made with funds in an account administered by the service provider computing system. The method may also comprise receiving a request to integrate payment API services into a third-party client application provided by a third-party client computing system of a third-party client. The request to integrate payment API services into the third-party client application may be received from the first computing device during the first secure session. The service provider and the third-party client may have independent computing systems. The method may moreover comprise generating a security token unique to the first user. The method may additionally comprise transmitting the security token to the third-party computing system. The security token may be transmitted to the third-party computing system in response to approval of the request. The method may further comprise accepting a first API call from the third-party client computing system. The first API call may include the security token. The first API call may alternatively or additionally include payment data for a payment. The payment data may identify a payee and a payment amount. The first API call may be transmitted to the service provider computing system in response to submission of the payment for approval by the first user. The payment may have been submitted for approval via the third-party client application running on a second computing device. The second user may submit the payment within the operating environment of the third-party client application. The second user may additionally or alternatively submit the payment without use of an application or website of the service provider. The method may furthermore comprise initiating a second secure session with the first computing device. The method may furthermore comprise receiving approval of the payment. Approval of the payment may be received from the first computing device during the second secure session. The method may furthermore comprise initiating an electronic funds transfer of the payment amount to the payee from the account.

Another embodiment of the disclosure relates to a method implemented by a service provider computing system of a service provider. The method may comprise initiating a first secure session with a first computing device of a first user who is authorized to approve payments. The payments may be made with funds in an account accessible to the service provider computing system. The method may also comprise receiving a request to integrate payment API services into a third-party client application provided by a third-party client computing system of a third-party client. The request to integrate may be received from the first computing device during the first secure session. The service provider and the third-party client may have independent computing systems. The request to integrate may be received via one of the client application running on the first computing device and a website or application of the service provider running on the computing device. The method may moreover comprise determining that the third-party client computing system received payment APIs. The APIs may have been received from the service provider computing system. The method may additionally comprise approving the request to integrate. The request to integrate may be approved in response to determining that the third-party client computing system received the payment APIs. The method may further comprise accepting a first API call from the third-party client computing system. The first API call may include payment data for a payment. The payment data may identify a payee and a payment amount. The first API call may be transmitted to the service provider computing system in response to submission of the payment for approval. The payment may have been submitted for approval via the third-party client application running on a second computing device. The second computing device may accept the payment submission within the operating environment of the third-party client application. The second computing device may additionally or alternatively accept the payment submission without the second computing device using an application or website of the service provider. The method may furthermore comprise initiating a second secure session with the first computing device. The method may furthermore comprise receiving approval of the payment. Approval of the payment may be received from the first computing device during the second secure session. The method may furthermore comprise initiating an electronic funds transfer of the payment amount to the payee from the account.

Another embodiment of the disclosure relates to a computing device that may comprise a network interface configured to communicate data with a client computing system of a client via a telecommunications network. The computing device may comprise one or more user interfaces configured to receive inputs from a user of the computing device and visually present graphical user interfaces. The computing device may also comprise memory having stored thereon a client application of the client. The client application may be configured to present, via the one or more user interfaces, a first set of one or more pages requesting information on a set of one or more payments. The information for each payment may include a payee and an amount owed thereto. The client application may accept from a first user, via the one or more user interfaces, the information on the set of one or more payments. The payments may be made from an account held by a service provider. The service provider may be a third party with respect to the client with independent computing systems. The client application may present, via the one or more user interfaces, a visually-perceptible active link to allow the first user to select submission of the set of one or more payments for approval via a second computing device of a second user with approval rights. The client application may receive a signal indicating activation of the link via the one or more user interfaces. In response to receiving the signal, and without using an application of the third-party service provider or directing the first user to a website of the third-party service provider, the client application may cause the client computing system of the client to make a submit-payment application programming interface (API) call to an external service provider computing system of the third-party service provider. The submit-payment API call may include a security token and payment data identifying at least one payee and corresponding payment amounts. The security token may be configured to authenticate the client computing system to the external service provider computing system and to identify the first user. The client application may present a visually-perceptible display element via the one or more user interfaces indicating that one or more payments in the set of payments has been submitted for approval by the client computing system. The client application may receive, from the client computing system of the client, a status update after the second user has approved the one or more payments. The client computing system may receive a notification from the service provider computing system when there is a change in the status. The notification may include the latest payment status, or may prompt the client computing system to request or otherwise retrieve the latest payment status from, for example, the service provider computing system. The client computing system may additionally or alternatively have received the status update and/or additional information about the payment from the external service provider computing system by making a view-payment API call to the service provider computing system. The external service provider computing system may initiate funds transfers for approved payments. The client application may present, via the one or more user interfaces, a visually-perceptible display element indicating that the one or more payments submitted for approval have been approved and/or have been scheduled for payment by the external service provider computing system. The client application may allow the computing device running the client application to submit payments for approval from within the operating environment of the client application without interacting with an operating environment of an application or website provided by the service provider computing system of the third-party service provider holding the account.

Another embodiment relates to a service provider computing system associated with a service provider. The service provider computing system may comprise a network interface configured to communicate data with an external third-party client computing system of a third-party client via a network. The third-party client may be a third party with respect to the service provider with independent computing systems. The service provider computing system may also comprise a processor and a memory having instructions executable by the processor. The service provider computing system may be configured to generate a security token unique to a first user. The service provider computing system may provide the security token to the third-party client computing system of the third-party client. The security token may be stored in memory of the third-party client computing system for transmission to the service provider computing system to authenticate the third-party client computing system. The third-party client computing system may provide a third-party client application to a first computing device of the first user. The third-party client application may be usable to track expenses or perform other financial management functionalities. The service provider computing system may accept a submit-payment API call from the third-party client computing system. The submit-payment API call may have been transmitted to the service provider computing system in response to an instruction, received from the third-party client application running on a second computing device of a second user, to submit a payment for approval via the first computing device. The submit-payment API call may include the security token and payment data identifying a payee and a payment amount for the payment. The second computing device may submit the payment to be paid by the service provider computing system using an account held at the service provider. The payment may be submitted for approval within the operating environment of the third-party client application and not via a separate application or website of the service provider. The service provider computing system may use the network interface to initiate a secure session with the first computing device. The service provider computing system may provide, to the first computing device during the secure session, the payment data identifying the payee and the payment amount. The service provider computing system may receive, from the first computing device during the secure session, approval of the payment. The service provider computing system may initiate an electronic funds transfer of the payment amount to the payee from the account.

Another embodiment relates to a method implemented by a service provider computing system of a service provider. The method may comprise initiating a first secure session with a first computing device of a first user who is authorized to approve payments using an account held by the service provider. The method may comprise receiving, from the first computing device during the first secure session, a request to integrate payment API services of the service provider into a third-party client application provided by a third-party client computing system. The service provider and a third-party client associated with the third-party client computing system may have independent computing systems. The method may comprise generating a security token unique to the first user. The security token may be provided to the third-party client computing system in response to approval of the request. The method may comprise accepting a first API call from the third-party client computing system. The first API call may include the security token and payment data for a payment. The payment data may identify a payee and a payment amount. The first API call may have been transmitted to the service provider computing system in response to submission of the payment, via the third-party client application running on a second computing device, for approval via the first computing device. The second computing device may submit the payment within the operating environment of the third-party client application without use of an application or website provided by the service provider computing system. The payee and payment amount may have been submitted for payment by the service provider computing system using funds in the account. The method may comprise initiating a second secure session with the first computing device. The method may comprise receiving, from the first computing device during the second secure session, approval of the payment. The method may comprise initiating an electronic funds transfer of the payment amount to the payee from the account.

BRIEF DESCRIPTION OF THE DRAWINGS

FIG. 10 is an example third-party client application graphical user interface, according to an example embodiment.

FIG. 11 is an example third-party client application graphical user interface, according to an example embodiment.

DETAILED DESCRIPTION

Figure 1:
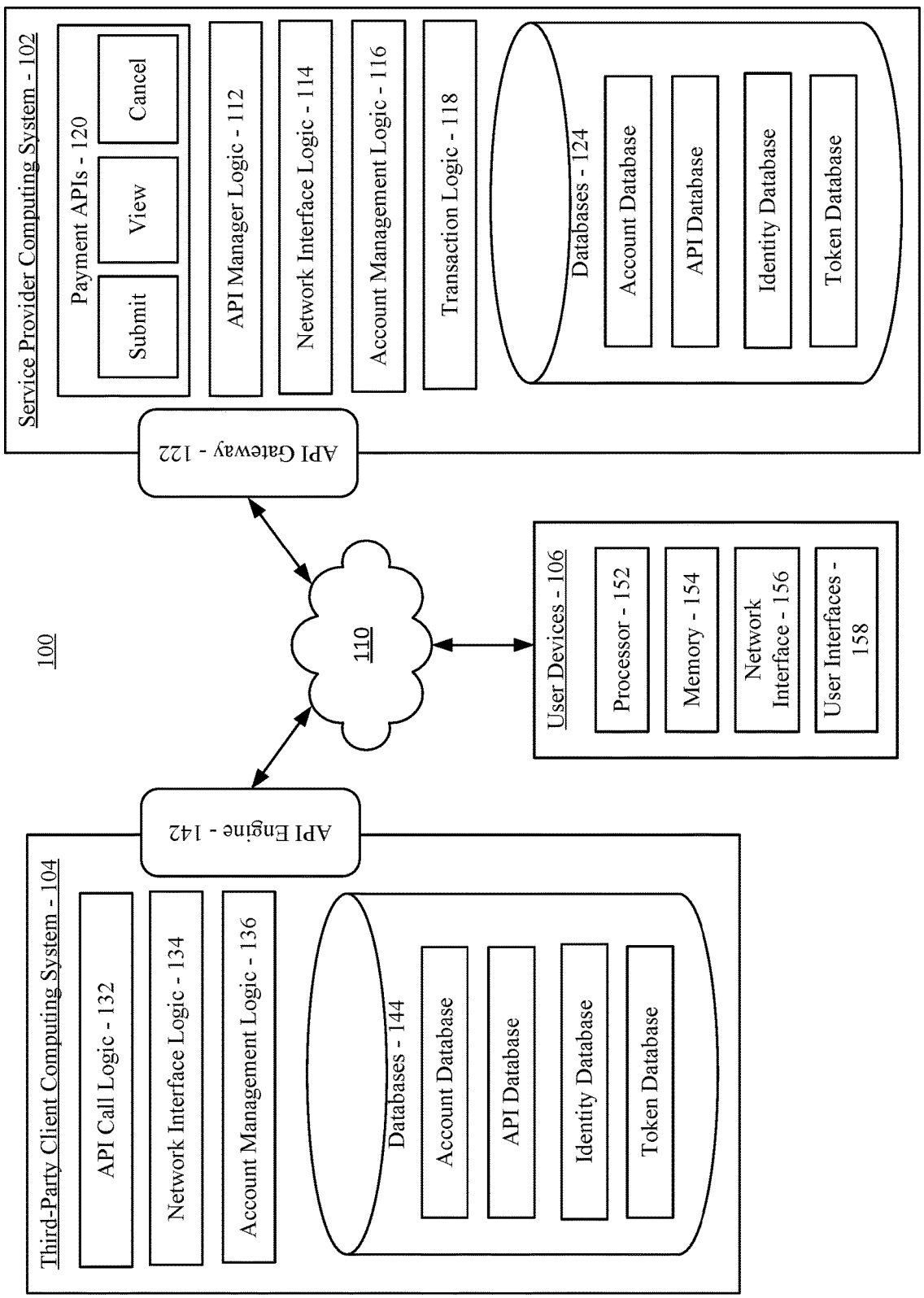
FIG. 1 is a block diagram of a computer-implemented system, according to an example embodiment.

Various embodiments described herein relate to systems and methods for integrating payment services into third-party client applications to provide users frictionless access to functionalities previously requiring multiple independent applications. In various embodiments, a client computing system provides or otherwise facilitates the operation of a client application on a user computing device. The client application is configured to allow users to, for example, track expenses or otherwise manage finances. In a first aspect, a presentation tier of the client application is configured to present a multi-feature graphical user interface (GUI) to the user. The multi-feature GUI enables the user to select from an array of functions from within one or more screens or pages. For example, in one embodiment, the integration GUI includes an account information portion and a plurality of transactions features (e.g., buttons, icons, links, etc.). The account information portion may enable the user to select an account (e.g., a financial account, a business or unit thereof, a payor, or a category of expenses) and, for example, view a balance or other information associated with the account. A payment feature of a service provider (such as a financial institution that is a third party to the client and thus has separate computing systems) may be integrated with the client application to allow the user to conduct a plurality of types of transactions (e.g., payments) via the user device from within the operating environment of the client application without launching or otherwise using an application or website of the service provider. The service provider computing system can perform functions for a user as though the user were using an application or website provided by the service provider computing system rather than a third-party client application. Technically and beneficially, such an arrangement enables the user to make payments using funds in an account administered using the service provider computing system via a single screen and/or single application provided by the client computing system. This eliminates the need for the user to switch back and forth between various applications or screens, thus improving the efficiency of the user device's operation.

In yet another aspect, integration of a payment service into a third-party client application eliminates the need for users to access an application or website of the service provider to access payment services accessible therein. In this regard, the service provider computing system may include a plurality of software integration packages deliverable to a plurality of third-party computing systems to allow the third-party client computing systems to provide users with payment services from within the operating environment of their own third-party client applications. The software integration packages may include multiple components to facilitate or enable various functionalities from within the client application provided by the third-party client computing system that would otherwise require use of a service provider application or website. For example, a first software integration package may include an application programming interface (API) stored at one or more third-party client computing systems to allow the third-party client computing system to make API calls to the service provider computing system to provide payment services otherwise requiring an application or website provided by the service provider computing system.

In an example, via an accounting application provided by a third-party client computing system, a first computing device may be used by a first user to provide the third-party client application with a particular expense by identifying a payee and a payment amount (i.e., amount owed). The client application may allow the user to activate a link to submit selected payments. The first user may be approved to submit payments, but the payments are not processed until approved by a second user. In response, the third-party client computing system may receive the payment information from the third-party client application and make an API call (e.g., a "submit-payment" API) to the service provider computing system. Once submitted, a second computing device of a second user (e.g., a business owner or other approver of payments) may be used to review payments proposed via the first computing device. The second computing device may be used to review payments via the third-party client application and/or via a website of the service provider via one or more secure communications sessions. In various embodiments described herein, the service provider computing system includes a plurality of APIs for facilitating the provisioning of different functionalities to be integrated into third-party client applications. Additional examples include an API for viewing payments, an API for canceling payments, and an API for approving or rejecting payments. This enables third-party client computing systems to flexibly integrate payment services provided via the service provider computing system into third-party client applications to create streamlined user experiences. This reduces data processing requirements at both the service provider computing system and the third-party computing system to enhance efficiency of third party integration.

In yet another aspect, a service provider computing system allows third-party client computing systems to implement payment functionality from within their own websites, applications, portals, gateways, or other electronic platforms. The service provider computing system can be associated with a provider of financial services, such as a bank or other financial institution. As used herein, the service provider and the client are third-parties with respect to each other, and consequently, the service provider may be a third-party service provider from the perspective of the client, and the client may be a third-party client from the perspective of the service provider. In various implementations, providing payment functionality from within a third-party platform like the third-party client application refers to the ability to manage payments to payees using the third-party platform, without being directed to or otherwise using the electronic platform or operating environment (e.g., the website, application, portal, gateway, etc.) of the service provider or other entity (e.g., an agent or representative of the service provider). The electronic platforms of the service provider and the third-party client have their own operating environments that are separately maintained by computing systems with their own security protocols and that may have their own distinguishing characteristics in terms of appearance, functionality, usability, etc.

In various implementations, client applications may provide payment functionality via one or more interface elements, such as payment APIs and/or payment software development kits (SDKs). APIs may be part of an API bank administered or provided by the service provider computing system. A third-party client computing system may use a payment API and/or SDK to incorporate payment functionality into its own platform. For example, a third-party client computing system may use such APIs to incorporate payment functionality into a website or application (e.g., a mobile application running on user computing devices) of the third-party client. The third-party client may then, at suitable times in its electronic interactions with a customer, allow the customer to indicate, via the web site or application provided via the third-party client computing system, a desire to, for example, make, cancel, or review a payment. The indication may be provided via any user interface mechanism deemed suitable, such as via touchscreen, voice prompt, keypad, etc.

A third-party client application may be an accounting or other financial management application used to, for example, manage the finances of a small business. Conventionally, users are required to run multiple applications and switch back-and-forth to, for example, make payments using an application of a financial institution or other service provider and return to the financial management client application to update the status of the payment as having been submitted for payment and/or as having been paid, and/or update account balances. Similarly, for a user to submit a payment for approval (e.g., an accountant wishing to pay an amount owed if approved by a business owner), the user may use a communications application to send a request for approval and receive a response, and another application of the financial institution to make the approved payment, referring back to the financial management client application for payee, payment amount, or other information, and referring back to the communications application for confirmation of which payments have been approved and which have not been approved, and for non-approved or deferred payments, to subsequently re-request approval in the future and/or to return to the financial institution application to make a payment in the future. If the user requesting approval is to make the payment on behalf of the account holder using an application of the financial institution (as opposed to the account holder submitting the payment for himself or herself), the user would need to be provided with login credentials or other verification data for the account holder to initiate payments. In other situations, a first user device may be used by the account holder to submit a payment for approval via a second user device of an accountant or other entity. Integration of payment services as discussed herein with respect to various embodiments enhances efficiency by saving time, saves computing resources (memory, processing power, communications, etc.) by requiring fewer applications, fewer processes, and fewer steps to be performed, and enhances security by avoiding the need to share login credentials or otherwise providing users who help manage finances to necessarily have full access to the financial accounts of the account holder.

Once a user (whether the account holder or not) submits a payment for approval via the third-party client application, in various implementations, the client computing system may communicate with the service provider's computing system to exchange the data needed for the payment to be approved. From the user's perspective, account approval functionality may be implemented via back-end processes involving the client computing system and the service provider computing system. The approver may use the same application through which the payment was submitted for approval to approve and keep track of payments and amounts owed without having to leave the application for an application or website provided by the service provider computing system. The user and approver may submit and track payments within a single operating environment (i.e., the operating environment of the client application). Advantageously, because the user can remain in the same operating environment, the third-party client can more easily select, direct, or control the user experience. For example, the user may be presented with various perceptible elements (e.g., logos, trade or service marks, text fonts and colors, sounds, etc.) before and after the user submits payments to be processed by the service provider. The third-party client application can provide an enhanced, seamless user experience.

Additionally, the information already received from a user computing device (e.g., to manage finances) may be reused by the service provider computing system for processing payments. For example, the user may have already provided certain data on payees and amounts owed thereto. Those data, or a subset thereof, may be provided to the service provider computing system via API calls for processing a payment. The routine, conventional approach to making payments is to have a customer or other user maintain an accounting of their finances in one application and submit payments separately. This is often accomplished by having the user (or an intermediary) visit a website, launch a software application, or visit a physical branch of a financial institution. If a request to make a payment is received via an intermediary on behalf of the account holder, and not via an API call as discussed herein, processing of payments occurs through standard channels and is slower (e.g., by several days) than payments received via API calls.

Moreover, during the payment process, when a customer uses the website or application provided by the service provider computing system to request that a payment be made, the user experience is dictated by the website or application provided by the service provider computing system. For example, when a user is directed to a website of a financial institution to submit a payment, the layout, organization, style, and functionality of the website is controlled or otherwise determined by the financial institution, which may not provide the user experience and functionality desired by the user. As a result, the user performs a limited number of tasks and perceives visual elements (or nonvisual elements, such as sounds) as dictated by the financial institution's website or application. The third-party client application of the client conventionally would not direct any aspect of the user experience. It is unconventional to allow third-party client applications to direct funds administered by the service provider computing system, without directing the user to the service provider computing system for the process of making payments, and having the user return to third-party client application once the payment has been made to then update the user's records. It is moreover not routine or conventional to have the third-party client application continue to present its own perceptible elements, which may be visually perceptible screen elements (e.g., distinguishing logos, marks, text fonts and colors, or other perceivable outputs used regularly by the third party, etc.) or otherwise control or direct what the user sees, hears, or otherwise experiences during the payment process. The previous approaches pose unique technological challenges that are tackled by the disclosed technological solutions.

The disclosed systems, methods, and computer implementations may also improve current computing systems and payment systems by facilitating payments between parties via a reduced number of authenticated communications sessions between devices. For example, conventionally, a provider may communicate with a third-party client computing system via one or more authenticated communications sessions to submit information on expenses. In one or more separate authenticated communications sessions, a submitting user may communicate with an approving user to request approval and/or to propose payments with a financial institution and subsequently to receive approval of the proposed payments or a subset thereof. For approved payments, one or more authenticated communication sessions may be involved in submitting and confirming a payment. Once the payment has been approved and/or made, in one or more separate authenticated communications session with the third-party client, the user may provide the third-party client application with updates on amounts owed. This may need to be repeated for many payments. Each time a communications session is established and communicating parties are authenticated with each other, time and computing resources are required. By reducing the number of communications sessions that is required for managing finances and arranging payments, the clock time, processing time, programmatic instructions (e.g., for authenticating a user account) and other requirements of the central processing unit, memory utilization, and other system resources are reduced. Accordingly, system security is improved and payments are submitted more efficiently and more quickly completed than with current systems.

The disclosed systems, methods, and computer implementations also improve current computing systems and payment systems by allowing for one party to manage finances without unnecessarily gaining excessive access to financial accounts of the payor. A representative or agent of an account holder (such as an accountant or family member) who may wish to propose payments to be made on behalf of the account holder is able to efficiently submit payments for review without being given full access to the account (e.g., the login credentials of the account holder), something that would expose the account holder to additional security risks. Also, when more limited access is being provided to a user device of a submitter (e.g., view and entry rights but not payment submission), the security standards imposed may be reduced (e.g., two-factor authentication may not be required). The clock time, processing time, programmatic instructions required to authenticate users, and other requirements of the central processing unit, memory utilization, and other system resources are reduced because a transaction between the parties can be accomplished by giving a submitting party limited access to data about the approving party without requiring the provisioning of traditionally exchanged information needed to conduct payment transactions. Accordingly, transactions are less computationally intensive, system security is improved, and payments are more quickly completed than with current payment systems.

Referring generally to the figures, a service provider computing system provides various functionality to client computing systems through various application programming interfaces (APIs). Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization of the resources of the second computing system, such as data identifying users, accounts, dates, functionalities, tasks, etc.

In various embodiments discussed below, a service provider computing system provides payment functionality and services to client computing systems of third-party clients via multiple APIs. The client computing systems can provide financial management services to customers of the third-party client via a third-party client application that integrates the payment functionality provided by the service provider computing system. The third-party client application may include, for example, selectable links to allow users to perform payment-related functions. When a link is selected, the third-party client computing system may make a corresponding API call to the service provider computing system. The API call may be for, for example, submitting, viewing, and/or canceling payments. A submitting user (such as an accountant) may be granted access to accounting data of an approving user (such as an owner of a financial account) via the client application. In an example implementation, the submitting user could activate a "submit payment" link in the application to cause the third-party client computing system to make a submit-payment API call to the service provider computing system to provide the approving user with the proposed payments for review and approval. Users could similarly activate links for, for example, viewing, approving, and/or canceling payments to cause the third-party computing system to make view-payment, approve payment, and/or cancel-payment API calls, respectively, to the service provider computing system.

Referring to FIG. 1, a block diagram of a computing system 100 for integration of payment functionality provided by a service provider computing system into third-party client applications, according to example embodiments. As shown, the computing system 100 includes a service provider computing system 102 associated with a service provider, such as a financial institution that provides banking services to individuals and other entities (e.g., deposit account services, credit account services, etc.). The service provider computing system 102 may include various servers and computing systems or may be embodied as a single computing device. The service provider computing system 102 includes at least one processor and memory to perform the various functions described herein. The system 100 also includes a third-party client computing system 104 associated with a third-party client and one or more user computing devices 106 (used interchangeably with user devices or simply devices 106) associated with one or more users, such as submitting users and approving users (who may use the same user device 106 or multiple user devices 106). As described herein, the third-party client computing system may provide client applications to be run on the user devices 106. The various systems and devices may be communicatively and operatively coupled directly and/or through a network 110, which may include one or more of the Internet, cellular network, Wi-Fi, Wi-Max, a proprietary banking network, or any other type of wired or wireless network or a combination of wired and wireless networks. As used herein, "client" refers to an entity that is a third-party to the service provider and that purchases or subscribes to payment API services provided by the service provider. As used herein, "users" are individuals or other entities who interact with the third-party client computing system 104 and/or the service provider computing system 102 via user devices 106. Users subscribe to accounting or other services provided via a third-party client application implemented via the third-party computing system 104. Users may also hold accounts administered via the service provider computing system 102. In this way, some users are customers of both the third-party client (e.g., by subscribing to services provided through the third-party client application) and the service provider (e.g., as an account holder).

The service provider computing system 102 includes various logic modules that control the operation of the service computing system 102. The logic modules include API manager logic 112, network interface logic 114, account management logic 116, and transaction logic 118. The API manager logic 112 controls the operations of payment APIs 120 provided by the service provider computing system 102. The APIs 120 provide various services to client computing systems 104 via an API gateway 122, which may accept API calls through network 110 and submit various data received as part of the API calls to API manager logic 112. The APIs 120 may include payment submit, payment view, and payment cancel. Other example APIs may include approve payment and reject payment. The data communications to and from the service provider computing system 102 are facilitated by the network interface logic 114, which may include hardware (e.g., Ethernet controller, memory, etc.) and software necessary to facilitate data communications for the service provider computing system 102 over the network 110 or directly with an external computing system (e.g., directly with third-party computing system 104 and/or user devices 106).

The service provider computing system 102 may provide various services to individuals and entities, such as the maintenance of deposit and credit accounts, bill payment services, loan services, and the like. Accordingly, the account management logic 116 may be used by the service provider computing system 102 to maintain the various accounts associated with account holders with the service provider. The account maintenance tasks may include maintaining account balances, account logins and passwords, providing banking websites and smartphone applications to account holders, initiating account statement deliveries, and the like. The account management logic 116 may include a token generator for generating security tokens. A token may be substituted as a proxy for data, serving as a surrogate value that can be used to replace underlying sensitive value. A token may be issued as a proxy for login credentials for specific users, and may be used indicate a level of access rights. The transaction logic 118 may be used by the service provider computing system 102 to perform financial or other transactions associated with maintained accounts. The financial transactions may include credit card processing, account transfers, check processing, automated clearing house ("ACH") transaction processing, deposits, withdrawals, interest payments, and the like.

The service provider computing system 102 includes various databases 124. The databases may include an account database, an identity database, an API database, and a token database. The account database may store information relating to a plurality of financial accounts associated with a plurality of users maintained by the service provider. The token database stores token information associated with the account management logic 116. The identity database stores information relating to the identities of customers, users, and account holders. The API database stores information relating to APIs 120.

Still referring to FIG. 1, the third-party client computing system 104 may be associated with a third-party client that provides a third-party client application for accounting, cash flow and rewards management, and so forth (e.g., Wave Accounting, QuickBooks, Xero, Expensify, and the like). Third-party client applications, whether installed natively, running as a web application, or a combination thereof, communicate with the third-party computing system 104 to exchange user data (e.g., account data) and provide information to the user. The third-party client computing system 104, which is independent of the service provider computing system 102, may include various servers and computing systems or may be embodied as a single computing device. The third-party client computing system 104 includes at least one processor and memory to perform the various functions described herein.

The third-party client computing system 104 includes various logic modules that control the operation of the third-party client computing system 104. The logic modules include API call logic 132, network interface logic 134, account management logic 136, and an API engine 142. The API call logic 132 controls the operations of transmitting API calls via the API engine 142 to the service provider computing system 102. The API call logic 132 may, for example, determine which API call is to be made based on a user's interactions with the third-party client application, and the API engine 142 may prepare the API call (with security token and other data accompanying the API call) and use the network interface logic 134 to transmit the API call to the service provider computing system 102. The API calls may include payment submit, payment view, and payment cancel. The data communications to and from the third-party client computing system 104 are facilitated by the network interface logic 134, which may include hardware (e.g., Ethernet controller, memory, etc.) and software necessary to facilitate data communications for third-party client computing system 104 over the network 110 or directly with an external computing system (e.g., directly with service provider computing system 102 and/or user devices 106).

The third-party client computing system 104 may provide various services to individuals and entities, such as accounting or other financial management services. Accordingly, the account management logic 136 may be used by the third-party client computing system 104 to maintain, for example, the financial data associated with customers of the third-party client. Account maintenance tasks may include tracking balances and entries, account logins and passwords, providing the third-party client application to user devices 106 of account holders, and the like. The third-party client computing system 104 includes various databases 144. The databases may include an account database, an API database, an identity database, and a token database. The account database may store information relating to a plurality of accounts associated with a plurality of users maintained by the third-party client computing system 104. The token database stores security or access tokens (such as tokens from the service provider computing system 102) used for authentication. The identity database stores information relating to the identities of users and account holders. The API database stores information relating to the APIs that may be called by the third-party client computing system 104.

Each user computing device 106 includes a processor 152 and a memory 154. The memory 154 stores programming modules that, when executed by the processor 152, control the operation of the user device 106. The user device 106 may be a personal computing device associated with a user, such as a laptop, a desktop, a PDA, a smartphone, a tablet, etc. The user device 106 further includes a network interface 156 that allows the user device 106 to send and receive data over the network 110. The user device 106 also includes one or more user interfaces that can receive inputs from a user and present outputs from the user. Example user interfaces include any combination of a touchscreen, keyboard, computer mouse, stylus, non-touch display screen, microphone, speaker, camera, or any other device that is capable of capturing data and presenting perceptible (e.g., audible and/or visual) data, such as graphical user interfaces, to the user of the user device 106.

As described in further detail below, the service provider computing system 102 provides third-party computing systems 104 access to various APIs 120. The APIs 120 allow the third-party client computing systems 104 to integrate payment services offered by the service provider computing system 102 into client applications. The service provider computing system 102 may distribute an SDK to allow third-party client computing systems 104 to better integrate the functionality provided by APIs 120 into third-party client applications.

Figure 2:
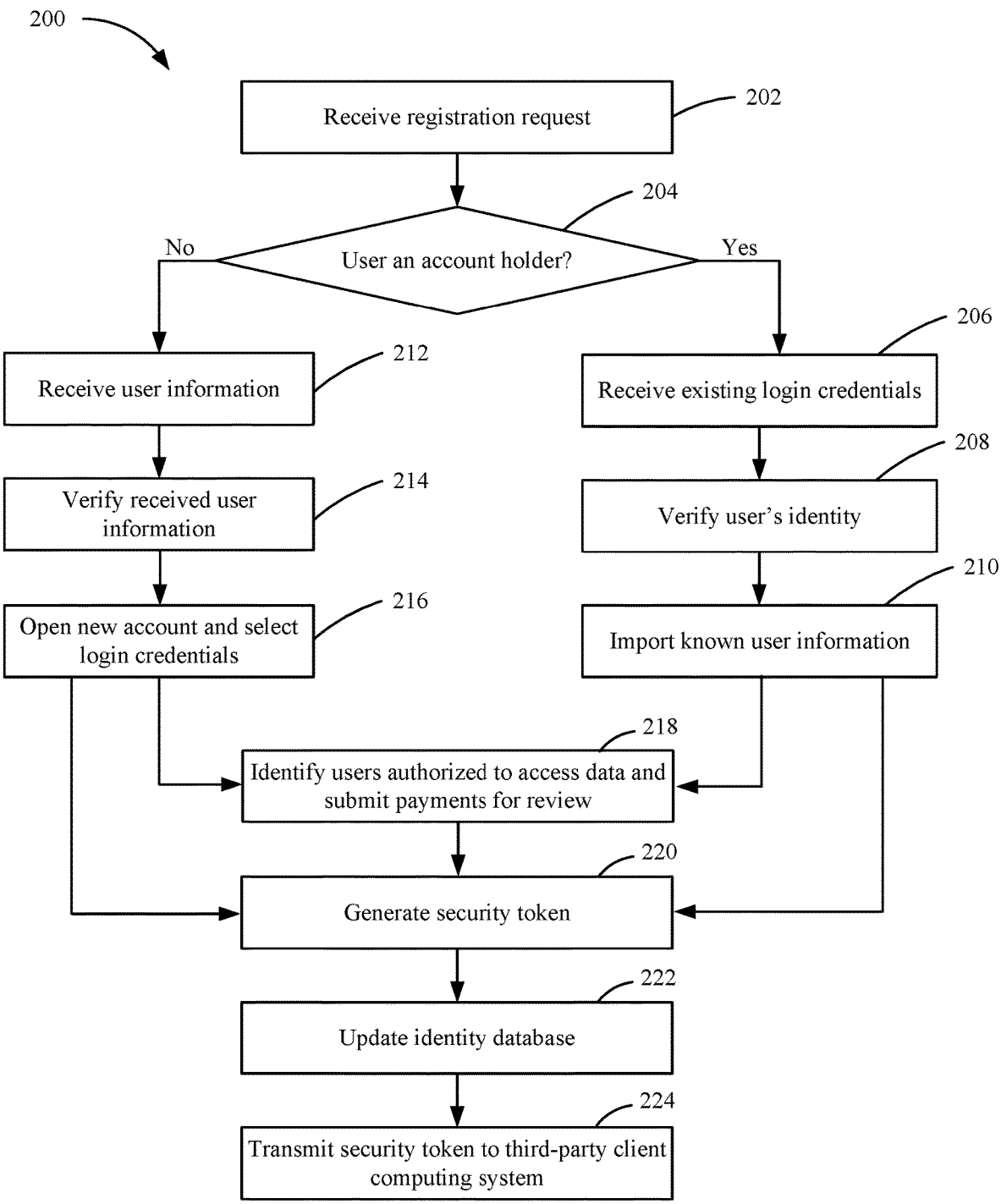
FIG. 2 is a flow diagram of a method of registering a user via a service provider computing system, according to an example embodiment.

Referring to FIG. 2, a flow diagram of a method 200 of registering a user with the service provider computing system 102 for the payment service is shown according to example embodiments. Method 200 is performed by the service provider computing system 102. Method 200 begins when a registration request is received (202). The registration request is sent by a user computing device 106 and is received at the service provider computing system 102. The registration request may include an indication that a user wishes to sign up to use the payment services provided by the service provider computing system 102 via a third-party client application. The registration request may include an identification of the particular third-party client application through which the payment service is to be accessed. In some arrangements, the registration request may include an indication that the user is already a customer of the service provider (e.g., an account holder). The service provider computing system 102 determines whether the user is an existing account holder (204). As described in further detail, if the user is an account holder with the service provider, the user may not be required to provide as much information to the service provider computing system 102 during the registration process than if the user is not an existing account holder with the service provider.

If the user is an existing account holder customer, the service provider computing system 102 receives existing login credentials from the user device 106 (206). The existing login credentials may be received at 202 with the registration request. The login credentials may include a username and a password used by the user to log into an online account portal provided by the service provider computing system 102. The online account portal allows the user device 106 to access information on accounts with the service provider.

After receiving the login credentials from the user device 106, the service provider computing system 102 verifies the user's identity (208). The service provider computing system 102 may compare the received login credentials to verified login credentials stored at the service provider computing system 102 (e.g., in the account database). The user is verified if the received login credentials match the stored login credentials, and the user is not verified if the received login credentials do not match the stored login credentials. If the user is not verified, the service provider computing system 102 may prompt the user device 106 to request reentry of the login credentials or restart method 200.

Once the user device 106 has been verified, known user information is imported from the databases 124 (210). Because the user is an existing account holder, the user has already gone through an onboarding process for opening an account through the service provider computing system 102. During the initial onboarding process used by the service provider computing system 102 to verify the user before permitting the user to become an account holder, the user device 106 provided certain personal information, such as legal name, address, contact information, tax identification numbers, social security numbers, and the like. The personal information provided by the user device 106 during the onboarding process was previously verified prior to permitting the user to open an account with the service provider. Accordingly, the user's information already on file with the service provider has already been received and verified by the service provider computing system 102. The verified user information is stored in at least one of the databases 124 of the service provider computing system 102 (e.g., in the account database). Accordingly, the user's information may be pulled from the databases 124 for the purposes of registering the user for the payment service.

If the user is not an existing account holder, the service provider computing system 102 accepts user information entered by the user via one or more of the user interfaces 158 of the user device 106 (212). The received user information may include similar information used to board a prospective account holder via the service provider computing system 102. Accordingly, the received information may include certain personal information, such as legal name, address, contact information, tax identification numbers, social security numbers, and the like. The user device 106 may provide the user information via one or more graphical user interfaces presented on a display of the user device 106.

The service provider computing system 102 may then verify the received user information (214). For example, the service provider computing system 102 may transmit the received information to at least one external service provider computing system, such as the EWS (Early Warning System), a credit bureau, or a third-party identification verification service. The external service provider computing systems may cross-reference known or previously verified information associated with the user to determine if the information provided by the user device 106 matches known or previously verified information. In some arrangements, the service provider computing system 102 may also poll its own databases 124 to compare the received information with known or previously verified information associated with the user. If the user information provided by the user device 106 sufficiently matches known or previously verified information associated with the user, the user information will be deemed to be verified. If the provided user information does not sufficiently match known or previously verified information associated with the user, the request from the user device 106 to register may be rejected or the user device 106 may be prompted to request reentry of the requested user information. In other arrangements, the user may be required to provide additional documentation (e.g., a scan of a driver's license) or to arrange an in-person meeting with a representative of the service provider (e.g., at a branch of a bank) to verify the user's identity in person. With the user information verified, the service provider computing system 102 may open a new account, for which login credentials can be assigned and/or selected via the user device 106.

After the user information is imported (at 210) or verified (at 214), the service provider computing system 102 may generate a security/access token unique to the user (220). The security token is used by the third-party client computing system 104 for authenticating the third-party client computing system 104 and/or for identifying the user when making API calls to the service provider computing system 102. In some arrangements, the security token generated does not include the login credentials received at 206 or assigned/selected at 216. Hence, if the created security token is compromised, the existing login credentials for the user will not also be compromised.

The identity database of the service provider computing system 102 is updated (222). The identity database is one of the databases 124 maintained at the service provider computing system 102. The service provider computing system 102 updates the identity database with the user information (imported at 210 or verified at 214) and associates it with the security token generated at 220. The identity database is updated such that when the service provider computing system 102 receives the security token via the API gateway 122, the service provider computing system 102 can process payments corresponding with the correct user accounts. The security token may be transmitted to the third-party computing system 104 via a secure communications session (224).

In some embodiments, the service provider computing system 102 determines which users are authorized by the account holder to submit payments for review (218). The users may be selected from a list, which may be generated by the service provider computing system 102 based on known relationships with the account holder or prior registration. Alternatively or additionally, the users may be identified by receiving from the user device 106 the names and contact information (e.g., email address) of users. The service provider computing system 102 may then invite the identified users (via, e.g., a message sent to an e-mail address received from the user device 106) to register, or may wait for the user to, for example, connect with the service provider computing system 102 through a registration portal.

Figure 3:
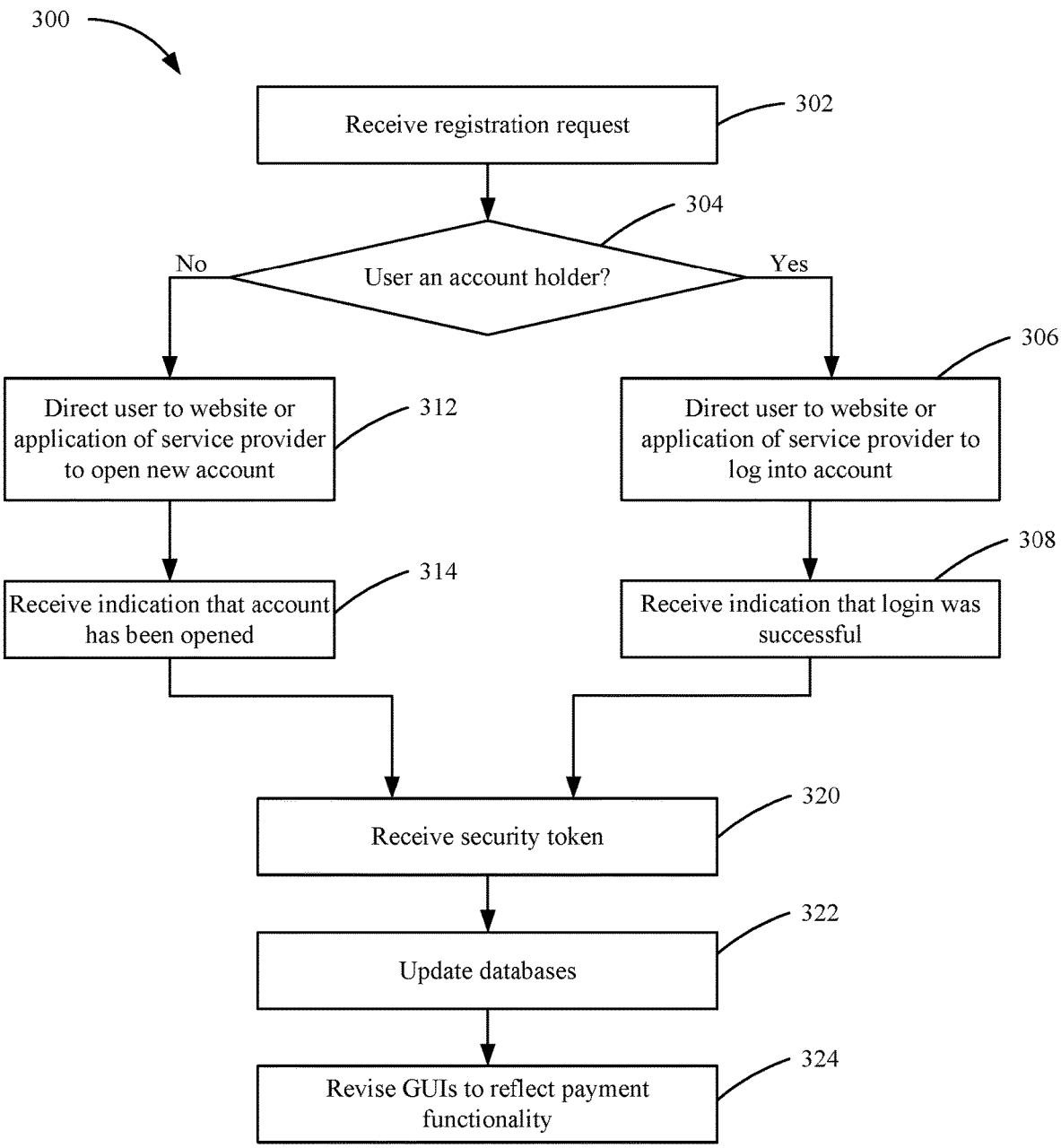
FIG. 3 is a flow diagram of a method of registering a user via a third-party client computing system, according to an example embodiment.

Referring to FIG. 3, a flow diagram of a method 300 of registering a user with the third-party client computing system 104 for the payment service provided by the service provider computing system 102 is shown according to example embodiments. Method 300 may be performed by the third-party client computing system 104 via a website provided by the third-party client computing system 104 or via the third-party client application. Method 300 begins when a registration request is received (302). The registration request is sent by a user computing device 106 and is received at the third-party client computing system 104. The registration request may include an indication that the user wants to sign up to access, via the third-party client application, the payment services provided by the service provider computing system 102. The registration request includes an identification of the particular service provider through which the payment service is to be implemented. In some arrangements, the registration request may include an indication that the user already has an account administered by the service provider computing system 102 (e.g., a financial account). The third-party client computing system 104 may determine whether the user is an existing account holder (304) via, for example, an inquiry submitted to the service provider computing system 102 by the third-party client computing system 104 during a secure communications session with the service provider computing system 102.

If the user does not already have an account administered by the service provider computing system 102, the third-party client computer system 102 may instruct the user device 106 to direct the user to a website or application through which the service provider computing system 102 opens a new account for the user (312). In some implementations, the third-party client computing system 104 may make an account-open API call to the service provider computing system 102 to open an account. Once an account has been opened, the third-party client computing system 104 may receive from the service provider computing system 102 an indication that an account has been opened for the user (314). If the user was already an account holder, the third-party client computer system 104 may instruct the user device 106 to direct the user to a website or application so that the user can provide the service provider computing system 102 login credentials for the account (306). Once the user has logged in, the third-party client computing system 104 may receive from the service provider computing system 102 an indication that login was successful (308). The third-party client computing system 104 may then receive a security token unique to the user (320) that is generated by the service provider computing system 102. The security token, which is stored in token database of database 144, is used by the third-party client computing system 104 for authenticating the third-party client computing system 104 and/or for identifying the user when making API calls to the service provider computing system 102.

The databases 144 of the third-party client computing system 104 are updated (322). For example, the account database may be updated to reflect the linking of the account at the third-party client computing system 104 to the user's account at the service provider computing system 102. The third-party client computing system 104 may then revise or modify the GUIs presented by the third-party client application to incorporate the added payment functionality (324). For example, when an expense, payee, debt, etc., is entered or viewed by the user via the third-party client application, the third-party client application may display activatable links to allow the user to submit payments, view the status of payments, and/or to cancel payments, as further discussed below.

Figure 4:
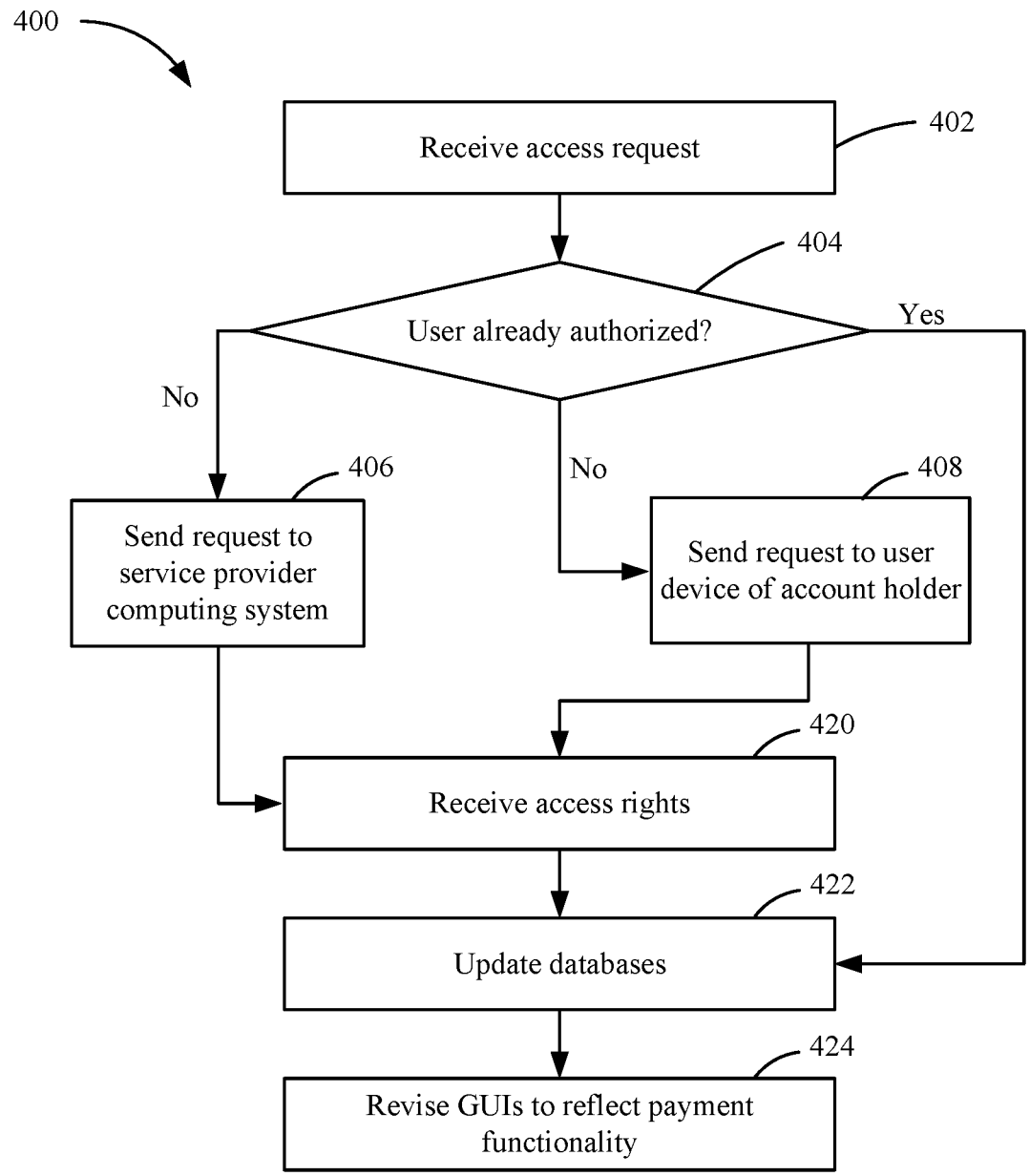
FIG. 4 is a flow diagram of a method of requesting access to user data in a third-party client application, according to an example embodiment.

Referring to FIG. 4, a flow diagram of a method 400 of registering a second user who is not the account holder ("first user") for access to data entered into the third-party client application and for payment-submission rights is shown according to example embodiments. Method 400 may be performed by the third-party client computing system 104, via a website provided by the third-party client computing system 104, or via the third-party client application. Method 400 begins when an access request is received (402). The access request is sent by the user device 106 of the second user and is received at the third-party client computing system 104. The access request may include an identification of the first user (by name, account number, etc.). The third-party client computing system 104 determines whether the second user has already been authorized by the first user to access the data and submit payments for approval by the first user (404). This can be accomplished by the third-party client computing system 104 submitting an inquiry, via a secure communications session, to the service provider computing system 102. In some implementations, this can be accomplished via an API call to the service provider computing system 102. The first user may have granted the second user with access and/or payment-submission rights when registering for the payment service or at another time subsequent to registration (e.g., in response to an access request sent by the user device 106 of the second user to the service provider computing system 102).

If the second user is not already authorized, the third-party client computing system 104 may send a request to the service provider computing system 102 requesting access on behalf of the second user (406). The service provider computing system 102 may then submit a request to user device 106 of the first user for access from the first user, if not previously granted. Alternatively or additionally, the third-party client computing system 104 may send a request directly to the user device 106 of the first user to request access on behalf of the second user (408). If access is granted via the user device 106 of the first user, the third-party client computing system 104 may receive access rights from the service provider computing system 102 and/or the user device 106 of the first user (420). This may include a security token that is unique to the second user to grant the second user limited access to the account. Alternatively, the same security token may be used, and the corresponding API calls identify the second user or otherwise indicate that the API call is on behalf of the second user (who may be associated with certain rights and privileges with respect to the account in databases 124 and/or 144). The third-party client computing system 104 may then update databases 144 to reflect the access rights of the second user (422). The third-party client computing system 104 may revise or modify the GUIs presented via the third-party client application to incorporate the added payment functionality when the user device 106 of the second user is running the third-party client application (424). For example, when an expense, payee, debt, etc., is entered or viewed by the second user via the third-party client application, the third-party client application may display selectable links to allow the user to submit payments, view the status of payments, and/or to cancel payments. The GUIs may be modified by, for example, updating the client application or modules thereof, pushing additional functionality, etc.

Figure 5:
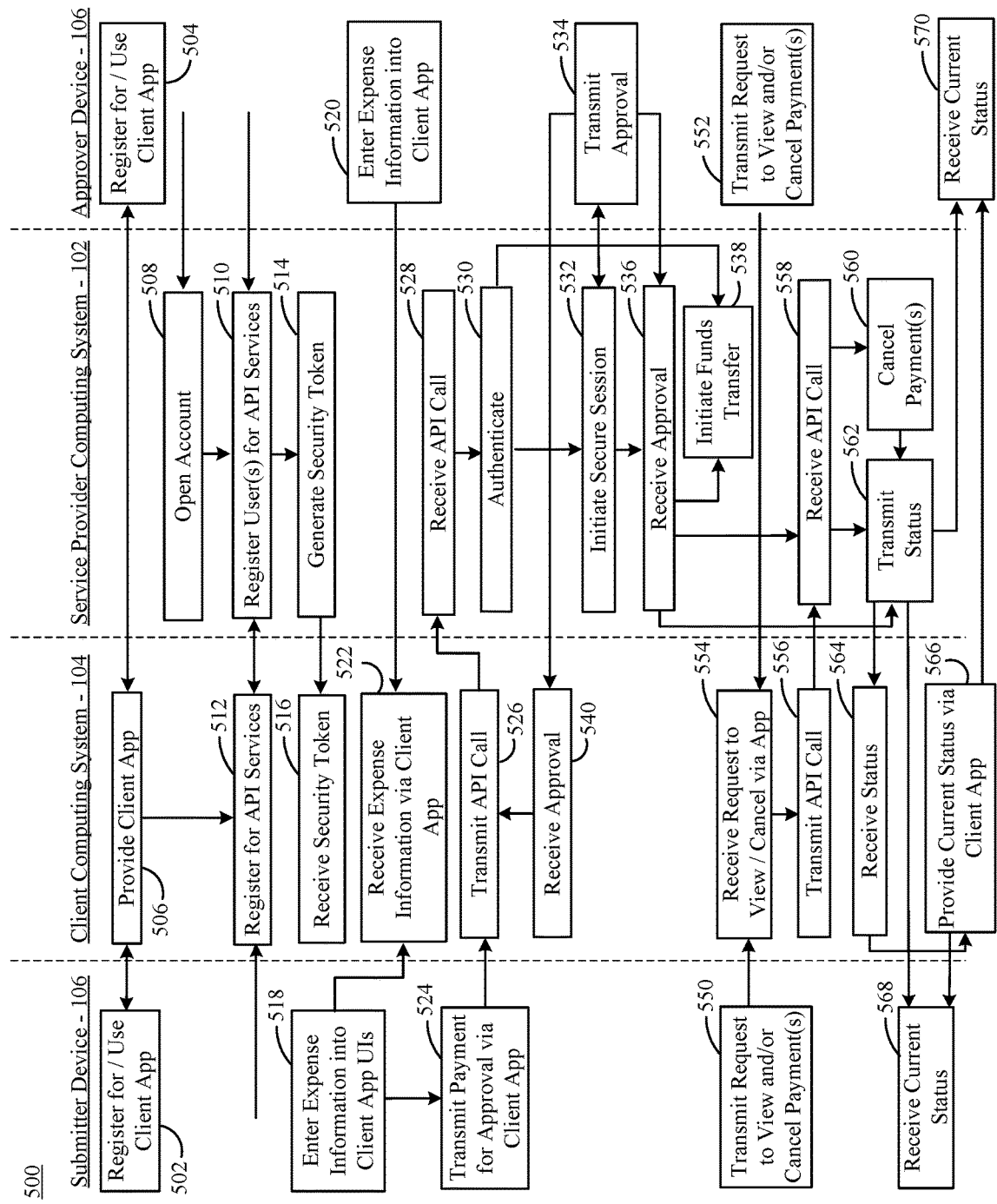
FIG. 5 is an interaction flow diagram of a method of integrating payment functionality into a third-party client application, according to an example embodiment.

Referring to FIG. 5, an interaction flow diagram of a method 500 of integrating payment functionality into a third-party client application is shown according to example embodiments. During method 500, the connections between a user device 106 of a payment submitter, the third-party client computing system 104, the service provider computing system 102, and a user device 106 of a payment approver are shown. The payment approver may be the account holder or another user authorized by the account holder to review and approve payments submitted by the payment submitter. In some implementations, the submitter may be, for example, an accountant, and the approver may be an account holder. In other implementations, the submitter may be the account holder, and the approver may be the accountant or other entity tasked with managing finances of the account holder.

In method 500, the submitter device 106 (502) and the approver device 106 (504) may register for and use the third-party client application to maintain an accounting of finances. The client application is an application provided by the client computing system 104 (506). If an account is not already open, the approver device 106 may communicate with the service provider computing system 102 to open an account held at the service provider (508). As part of the account-open process, or subsequent thereto, the approver device 106 may register for the payment API services of the service provider and identify the submitter as being granted access and payment-submission rights (510). Alternatively or additionally, the submitter device 106 and/or approver device 106 may communicate with the client computing system 104 (via the client application) to register for the integration of payment API services of the service provider into the client application (512). Once the payment API services have been requested, the service provider computing system 102 generates a security token (514) and provides the security token to the client computing system 104 (516).

The submitter device 106 (518) and/or the approver device 106 (520) may enter expense or other financial information into the client application, and the information is received at the client computing system 104 via the client application (522). The submitter device 106 may then submit a payment (i.e., a specified amount to be paid to an identified payee using funds from an account administered by the service provider computing system 102) via the client application for approval (524). Once the client computing system 104 has received the submitted payment information via the client application, the client computing system 104 transmits an API call (526) to the service provider computing system 102 (528). The API call transmitted by the client computing system 104 is accompanied by the security token generated at 514. The API call may also include, for example, data identifying a payment (e.g., by naming a payee and specifying a payment amount and/or by providing a record number or location in memory or in a database with the corresponding data on the payment to be made), the identity of the submitting user, the identity of the approving user, and/or an identification of user devices 106 used to run the client application and transmit expense and payment data. The service provider computing system 102 then uses the security token to authenticate the API call (530). The service provider computing system 102 may, for example, cross-reference data in the token database of databases 124 to determine the validity of the security token received from the client computing system 104 (e.g., that the security token has not expired or been revoked), and identify the users and user accounts associated with the security token. The service provider computing system 102 may then initiate a secure communications session with the approver device 106 (532). The approver device 106 may transmit approval of the payment (534) during the secure communications session, and the service provider computing system 102 may receive the approval (536). The approval may be submitted, for example, using a website or application provided by the service provider computing system 102. The service provider computing system 102 may then make a payment by, for example, initiating a transfer of funds from the account administered by the service provider computing system 102 to an account of the payee (538).

In some implementations, a user may make a selection to approve a payment (via, e.g., a corresponding link presented in a GUI). A login screen of the service provider may open from within the client application. The login screen may be provided by the service provider computing system 102. The login screen may be provided to the approver device 106 directly or via the client computing system 104. The user may then enter his or her login credentials and, if authenticated, may be presented with an approve payments flow. For example, the approver may be presented with an identification of one or more payments for which approval has been requested. The user may then be allowed to indicate, for example, that each payment is approved, rejected, or deferred by making a selection (e.g., by activating a link presented via a corresponding GUI, such as a drop-down menu or a set of selectable buttons, each button corresponding to one of the available options). Deferred payments may be presented again (e.g., during a subsequent billing cycle) to allow the approver to, for example, subsequently approve, reject, or defer again. A previously-deferred payment, when subsequently presented, may indicate, for example, a number of times the payment has been deferred, and/or the amount of time that has passed since the original request, since the previous deferral, and/or since a corresponding payment deadline (from, e.g., an invoice).

Alternatively or additionally, the approval may be transmitted by the approving device 106 at 534 to the client computing system 104 via the client application (540). The submit-payment API call may then be transmitted by the client computing system 104 to the service provider computing system 102 at 526. The service provider computing system 104 may receive the API call at 528, authenticate the security token (530), and initiate the funds transfer at 538 without initiating a secure communications session with the approver device 106 at 532 to receive approval at 536.

The submitter device 106 (550) and/or the approver device 106 (552) may, at any time, transmit a request to view one or more payments and/or a request to cancel one or more payments. The request to view and/or cancel payments may be transmitted by the submitter device 106 or the approver device 106 in response to, for example, the submitter device 106 or the approver device 106 receiving a signal indicating activation of a link provided in a GUI of the client application running on the submitter device 106 or the approver device 106. The link may visually present an option to, for example, view or cancel payments. The status of a payment may be viewed via the client application after a payment has been submitted. A payment may be canceled after the payment has been submitted but before the payment has been approved for payment, or after the payment has been approved for payment but before the funds transfer has been initiated (e.g., while the payment remains "in process").

The client computing system 104 receives the request to view or cancel one or more selected payments via the client application (554). The client computing system 104 may then transmit a corresponding API call (556) to the service provider computing system 102. The API call is a view-payment API call if the request is to view payments, and the API call is a cancel-payment API call if the request is to cancel a payment. The API calls are accompanied by the security token generated at 514. In some implementations, the view-payment API need not be accompanied by an identification of any specific payments as all pending payments may be deemed relevant. The cancel-payment API call is accompanied by data identifying one or more payments (e.g., by naming a payee and specifying a payment amount and/or by providing a record number or location in memory or in a database at which the payment to be canceled is located), the identity of the user requesting cancelation, and/or an identification of computing devices 106 used to run the client application and transmit the request to view or cancel payments.

The service provider computing system 102 receives the API call (558). If the API call was a cancel-payment API call, the service provider computing system 102 cancels (or, in some implementations, reverses the payment if a payment has been made, if possible) the identified payment(s) (560). The service provider computing system 102 then transmits the status of the payment (562) to indicate that the payment has been canceled (or that the payment remains "in process" because the payment could not be canceled) for presentation via the client application. Alternatively, if the API call received at 558 was a view-payment API call, the service provider computing system 102 proceeds to transmit the status at 562 (without canceling any payments at 560). The client computing system 104 receives the status (564) and makes the status available via the client application. The submitter device 106 (568) and/or the approver device 106 (570) may receive the status update from the client computing device 104 while using the client application. Alternatively or additionally, the service provider computing system 102 may at 562 transmit the status directly to the submitter device 106 at 568 and/or to the approver device 106 at 570.

In various implementations, the service provider computing system 102, after receiving approval at 536, proceeds directly to transmitting status at 562. The status may be transmitted to the client computing system 104, to the approver device 106, and/or to the submitter device 106. In some versions, the change in status may trigger a notification to the client computing system 104, to the approver device 106, and/or to the submitter device 106. In some implementations, the notification may include the updated status. In other implementations, the notification may indicate that there is a new status or other relevant information, and the receiver of the notification (e.g., the client computing system 104, the approver device 106, and/or the submitter device 106) may request the new status or other information from the service provider computing system 102 and/or from the client computing system 104. In some implementations, if the notification itself does not indicate the new status, the new status may be retrieved, for example, by the client computing system 104 making an API call to the service provider computing system 102.

In various versions, the submitter device 106 (550) and/or the approver device 106 (552) need not transmit a request to view one or more payments to receive the status or other information related to a payment. The user need not, for example, activate a link provided in a GUI (by the client application running on the submitter device 106 or the approver device 106) presenting an option to view payments (thereby triggering a view payment API call at, e.g., 556). Updating payment status may, for example, be performed in the background by the client computing system 104. The client computing system 104 may receive the latest payment details from the service provider computing system 102 via various notifications (sent, e.g., when there are updates or changes) and update its databases accordingly, and the latest information may be displayed within the client application on the submitter and/or approver devices 106.

In various embodiments, webhooks may be used for payment status updates. The client computing system 104 may receive a notification from the service provider computing system 102 when the payment status changes. The client computing system may analyze or review the notification for the latest payment status. In various implementations, a view-payment API call by the client computing system may, alternatively or additionally, allow the client computing system 104 to obtain additional information about payments. Such additional information may include, for example, a name of the approver, a date the payment was approved, a payment status reason (e.g., a reason received via the client application running on the approver device 106 when a payment is approved, rejected, deferred, etc.), and/or other data elements related to the payment. In some implementations, the one or more payments for which additional information is requested may be identified in the API call. In certain implementations, the specific additional information requested may be identified in the API call. In various implementations, a view-payment API call may be deemed to be a request for all additional information, and/or a request for additional information for all pending payments.

Figure 6:
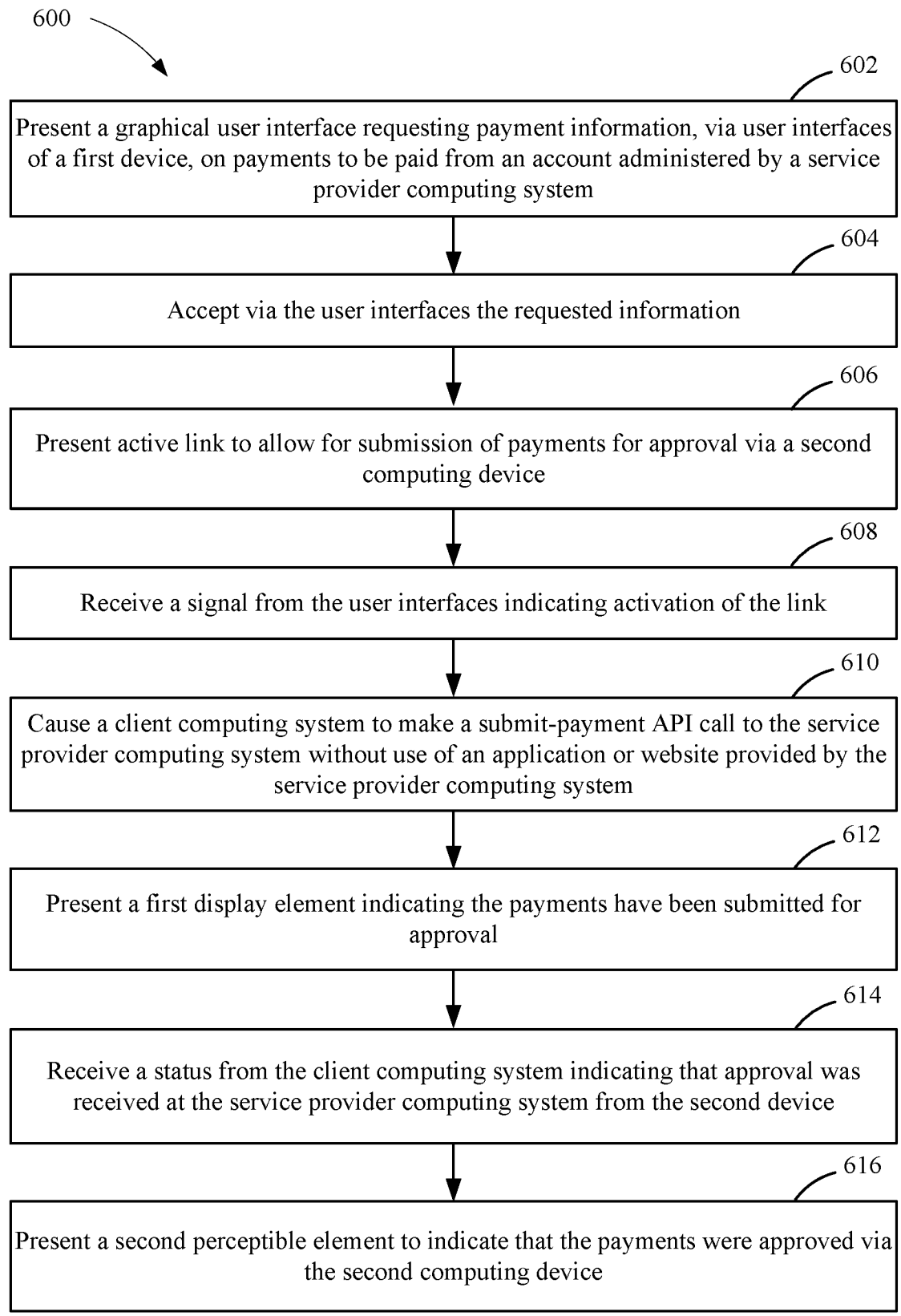
FIG. 6 is a flow diagram of steps performed via a third-party client application running on user devices, according to an example embodiment.

Referring to FIG. 6, a flow diagram of a method 600 of providing a client application that integrates the payment API services provided by a service provider computing system 102 is shown according to example embodiments. Method 600 may be performed by a user computing device 106 that is running the client application and that is communicatively coupled to a client computing system 104, which communicates with the service provider computing system 102. In various embodiments, the client application communicates with the client computing system 104 to provide users with financial management functionality. It is noted that from the perspective of the client computing system 104 of a client, the service provider computing system 102 is an external computing system of a third party.

The method 600 begins with the client application presenting a GUI via one or more user interfaces 158 (e.g., a display screen) of the user device 106 (602). In some implementations, the GUI includes one or more pages and/or fields to allow a first user to enter information on payments (e.g., amounts and entities owed) to be initiated by a service provider computing system 102 using funds administered by the service provider computing system 102. The user device 106 may accept the requested information via the one or more user interfaces 158 (e.g., a touchscreen or keyboard) of user device 106 (604). The client application may present an active link that can be activated to submit selected payments for approval (606). The link may be activatable via the one or more user interfaces 158. The client application may receive a signal from the one or more user interfaces 158 indicating that the link was activated (608). In some implementations, the signal identifies one or more payments selected, via the one or more user interfaces 158, for submission.

The client application may, in response to activation of the link, cause the client computing system 104 with which it communicates to make (via API engine 142) a submit-payment API call to the service provider computing system 102 (610). In some implementations, the client application uses the network interface 156 of the user device 106 to transmit a message or instructions to command the client computing system 104 to transmit the submit-payment API call to the external service provider computing system 102 via the API gateway 122. In other implementations, the client application uses the network interface 156 to transmit an indication to the client computing system 104 that the link has been activated, and the client computing system 104 is configured to, in response to receiving the indication that the link has been activated, transmit (via the network interface logic 134) the submit-payment API call to the external service provider computing system 102. In various implementations, the message, instructions, or indication of activation from user computing device 106 may specify which client application link was activated (e.g., a link for submitting payments for approval) to allow the client computing system 104 to determine (via API call logic 132) which API call is to be made via API engine 142. In some implementations, the message, instructions, or other indication may identify which payments have been selected. The selected payments may be identified by, for example, reference number and/or by specifying the entities to be paid and/or corresponding payment amounts.

The client application may present (via the user interfaces 158) a first display element indicating the payments have been submitted for approval (612). The first display element may be, for example, a status indicator, pop-up message, or other visually perceptible message or notification. In other implementations, the client application may alternatively or additionally use non-visual mechanisms for indicating the payment have been submitted for approval, such as audio and/or tactile indicators, alone or in combination with visual indicators. In various implementations, the client application may be configured to present the first display element (or other indicator) after the client application has transmitted (via the network interface 156) the message or instructions causing the client computing system 104 to transmit the submit-payment API to the service provider computing system 102. In other implementations, the client application may be configured to present the first display element (or other indicator) after the client application has received (via the network interface 156) a response from the client computing system 104 confirming that the message or instructions were received by the client computing system 104. In yet other implementations, the client application may be configured to present the first display element (or other indicator) after the client application has received (via the network interface 156) a response from the client computing system 104 confirming that the client computing system 104 has made the submit-payment API call to the API gateway of the service provider computing system 102.

Once the submit-payment API call has been received at the API gateway 122 of service provider computing system 102, the service provider computing system 102 may make the payments available for approval. The approvals may be received via a second computing device 106. In certain implementations, the second computing device 106 may approve via a second instance of the client application running on the second computing device 106. The client application may present, via one or more user interfaces 158 of the second user device 106, a GUI identifying payments, and one or more fields for accepting inputs (via the user interfaces 158) to indicate whether the payments (individually or in batches) are approved. Alternatively or additionally, approval may be received via a website or application (e.g., a native application running on the second user device 106) provided by the service provider computing system 102. In some versions, the service provider computing system 102 receives approval via one or more secure communications sessions with the second user computing device 106.

The client application running on the first device 106 may receive a status from the client computing system 104 indicating whether approval was received at the service provider computing system from the second device 106 (614). The client computing system 104 may request a status by making a view-payment API call to the service provider computing system 102. In certain implementations, the client computing system 104 makes view-payment API calls to the service provider computing system 102 periodically (e.g., once every hour, nightly, etc.), and if the status has changed (e.g., from "pending approval" to "approved" or to "rejected"), then the client computing system 104 may transmit the updated status to the user device 106. In various implementations, the client computing system 104 makes the view-payment API call in response to a request from the client application running on the first device 106 for a status update. In some implementations, the request from the first device 106 is transmitted to the client computing system 104 periodically, and the current status displayed via the one or more user interfaces 158. Additionally or alternatively, the request from the first device 106 is transmitted to the client computing system 104 in response to a signal received from the one or more user interfaces 158 indicating that, for example, a link for checking status has been selected. The client application running on the first device 106 may then present, via user interfaces 158, a second perceptible element to indicate that one or payments have been approved or rejected (616). The second perceptible element may be any combination of audible, visible, tactile, or other sensory stimuli.

Figure 7:
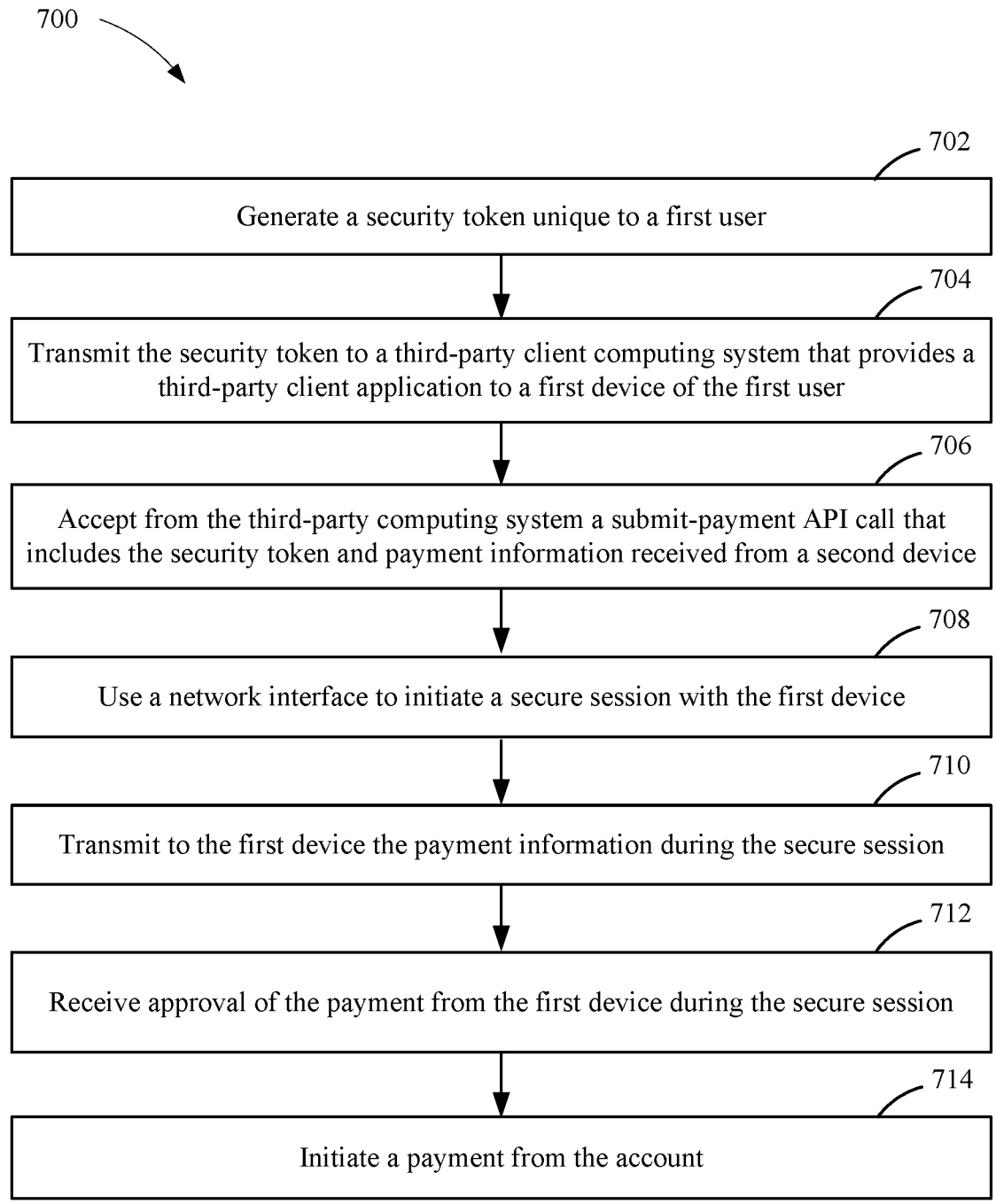
FIG. 7 is a flow diagram of steps performed via a service provider computing system, according to an example embodiment.

Referring to FIG. 7, a flow diagram of a method 700 of providing payment API services is shown according to example embodiments. Method 700 may be performed by a service provider computing system 102 that is communicatively coupled to a client computing system 104. It is noted that from the perspective of the service provider computing system 102 of a service provider, the client computing system 104 of a client is an external computing system of a third party.

The method 700 begins with the service provider computing system 102 generating a security token (702). In some implementations, the security token is generated by account management logic 116 of the service provider computing system 102 and stored in the token database of databases 124. The security token may be unique to a first user (who may be a submitter and/or an approver of payments), to the first device 106, and/or to an account (e.g., an account administered or maintained by the service provider computing system 102 or the client computing system 104). The security token includes data required for access to certain information or accounts by a particular device or user. The rights and privileges (e.g., view-only access, full access, etc.) for particular accounts, users, devices, etc., may also be indicated or referenced by the token. In some implementations, the token may be used to, at least in part, authenticate the device or user and indicate what functionalities are available to the device or user via an access portal.

The security token may then be transmitted to the third-party client computing system 104 that provides a third-party client application to a first device of the first user (704). The security token may be transmitted using network interface logic 114. The token may be stored in the token database 144 of the client computing system 104. The service provider computing system 102 may accept a submit-payment API call from the third-party computing system 104 (706). The submit-payment API call may be generated and transmitted via the API call module 132 and the API engine 142 using the network interface logic 134. The submit-payment API call may be transmitted in response to a communication (e.g., a message, instruction, etc.) from a client application running on a user device 106.

The service provider computing system 102 may initiate, using network interface logic 114, a secure communications session with the first device 106 (708). During the session, the service provider computing system 102 may transmit to the first device 106 information on one or more payments for which approval has been requested (710). The service provider computing system 102 may receive approval of one or more payments from the first device 106 during the secure communications session (712). The service provider computing system 102 may then use transaction logic 118 to initiate a payment from the account with funds previously identified as a source of funds for such payments (714).

Figure 8:
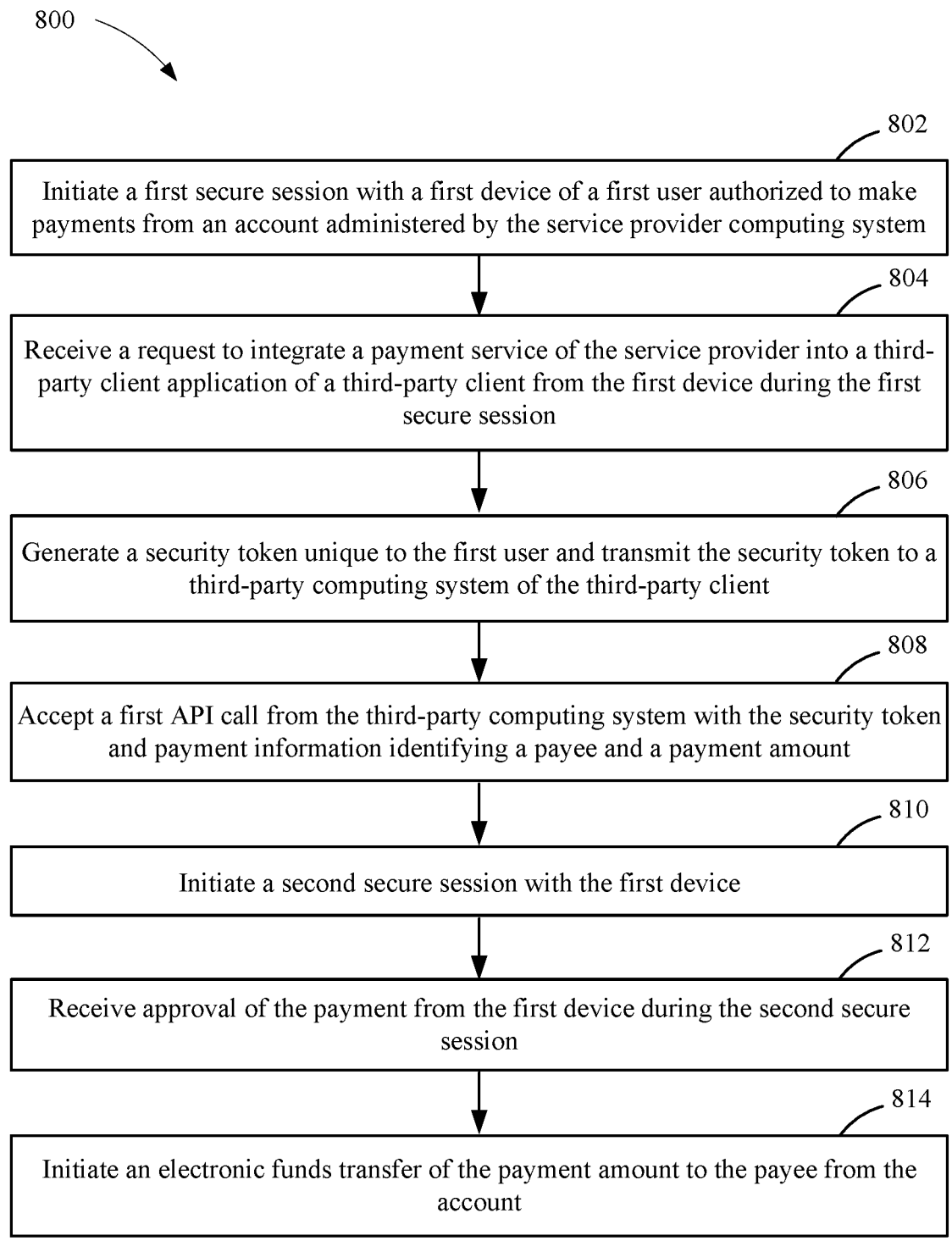
FIG. 8 is a flow diagram of a method implemented via a service provider computing system, according to an example embodiment.

Referring to FIG. 8, a flow diagram of a method 800 of providing payment API services is shown according to example embodiments. Method 800 may be performed by a service provider computing system 102 that is communicatively coupled to a client computing system 104. The method 800 begins with the service provider computing system 102 initiating a first secure session with a first device 106 of a first user who is authorized to make payments from an account administered by the service provider computing system 102 (802). The service provider computing system 102 may use network interface logic 114 to initiate the session with a network interface 156 of the first user device 106. The service provider computing system 102 may authenticate the first user, for example, by accepting credentials (e.g., login credentials such as a username and password) from the first user device 106 and comparing the credentials with credentials stored in databases 124.

If the request to integrate the payment service into the third-party client application is granted, the service provider computing system 102 may generate a security token unique to the first user and transmit the security token to the third-party computing system 104 of the third-party client (806). The request may be granted if, for example, the service provider computing system 102 has provided the third-party client computing system 104 with the APIs 120, such that the third-party client computing system 104 is able and authorized to make API calls via API gateway 122. Once it has the security token, the third-party client computing system 104 may make API calls with respect to the users registered to make or propose payments to be made using funds administered by service provider computing system 102.

The service provider computing system 102 may accept a first API call from the client computing system 104 (808). The first API call may include or be accompanied by the security token to authenticate the API call and identify the first user and the first user's account. The API call may be, for example, a submit-payment API call. To identify a payment submitted for approval, the API call may identify the payment to be approved. The payment may be identified by including payment information, such as a payee and/or payment amount, or an identifier (e.g., an alphanumeric string of characters) that may be cross-referenced (e.g., with data in databases 124) to determine the payment (e.g., payee and payment amount) with which the identifier corresponds.

The service provider computing system 102 may then initiate a second secure session with the first device. The second secure session may be initiated when, for example, the first user logs into his or her account via a website or application provided by the service provider computing system 102. The service provider computing system 102 may receive approval for a payment from the first device 106 during the second communications sessions (812).

In some implementations, the service provider computing system 102 transmits a message (e.g., an e-mail, text message, or application notification) to the first device 106 to inform the first user that one or more payments await approval. Such a message may provide the payment information, or may simply advise the recipient to log into his or her account to view payment information and approve/reject the payments. In other implementations, the service provider computing system 102 may simply wait for the next time the first device 106 is used to access an account to identify one or more payments for which approval has been requested. Additionally or alternatively, the service provider computing system 102 may transmit a message with payment information, and provide activatable links (e.g., one for approve and one for reject) which, when selected, transmit the first user's decision to the service provider computing system 102. In various implementations, the link may, for example, trigger a message (e.g., an email or text message using an application running on the first user device) to the service provider computing system 102 with approval or rejection, and/or may direct a browser running on the first device 106 to a uniform resource locator (URL) which, when visited, indicates approval or rejection to the service provider computing system 102.

For approved payments, the service provider computing system 102 may initiate an electronic funds transfer of the payment amount to the payee from the account or otherwise arrange for the payment (814). In some implementations, the service provider computing system 102 also administers an account of the payee into which funds are to be deposited. In other implementations, a payment may be made via a third-party intermediary. In some implementations, the service provider computing system 102 is a third-party intermediary that communicates with a financial institution computing system of the financial institution with the funds to be used to make payments. In various embodiments, the manner in which each payee is to be paid (e.g., the payee's account number for the account into which funds are to be transferred) may be provided to the service provider computing system 102 via the third-party client application, via an application or website provided by the service provider computing system 102, via secure communications sessions, and/or via API calls received from the third-party client computing system 104.

Figure 9:
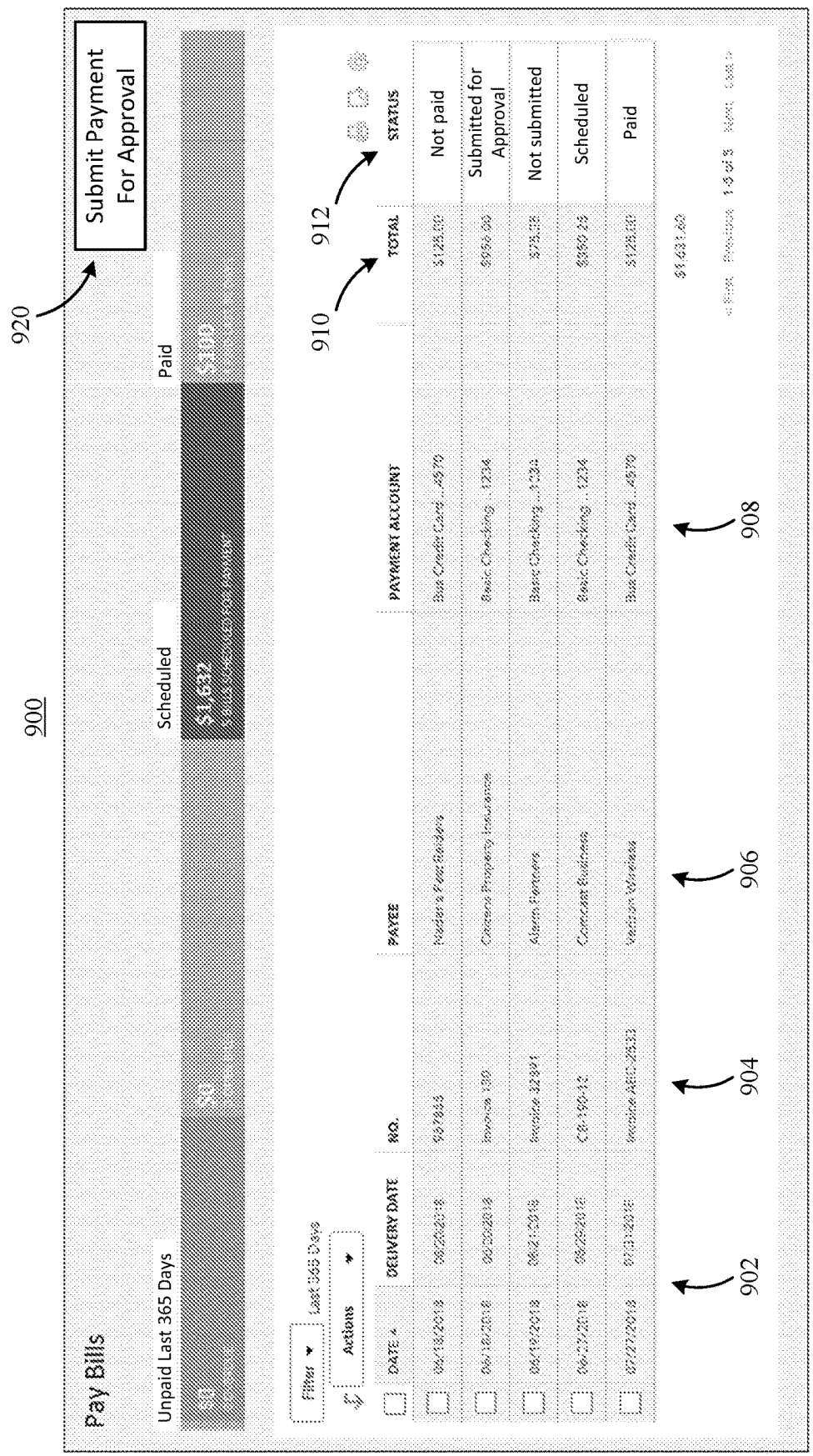
FIG. 9 is an example third-party client application graphical user interface, according to an example embodiment.

FIG. 9 shows an example GUI 900 of a third-party client application that integrates the payment services provided by the service provider computing system 102 according to example embodiments. GUI 900 depicts an example screen/page that allows a user to enter payment information and submit payments for approval. The GUI 900 may present a set of visually perceptible screen elements via a display device of, for example, a submitter device 106. GUI 900 provides a set of date fields 902 (shown in the first two columns of GUI 900) that may allow for the entry of dates corresponding to, for example, when an expense was incurred, when an invoice was received, when a payment is due, when a payment was delivered, etc. Dates may be user-entered or automatically populated using data from, for example, other applications, devices, systems, database, or documents (e.g., scanned invoices). In a set of identifier fields 904, GUI 900 may include reference numbers for each payment. In various implementations, the reference numbers may be, for example, entered by the user or generated by the client application, the client computing system 104, the service provider computing system 102, or the payee (e.g., as part of an invoice).

Payee fields 906 identify the recipients of payments. The payee may be user-entered or automatically-populated using information from various documents, devices, databases, etc. Although not provided in GUI 900, the client application may also have additional information on each payee to identify how payments are to be made (e.g., account numbers). Payment account fields 908 identify the account with the funds to be used to make each payment. In various implementations, the account is administered by a service provider computing system 102 that is a financial institution. In other embodiments, the service provider computing system 102 is an intermediary between the third-party client computing system 104 and a financial institution computing system administering the account with the funds to be used for payments. Payment amount fields 910 identify the total amount owed to each payee. The payee may be user-entered or automatically-populated using information from various documents, devices, databases, etc.

Status fields 912 include example statuses for each payment. A status of "submitted for approval," for example, may indicate that a payment was submitted by the client computing system 102 for approval via a submit-payment API to the service provider computing system 102. The client computing system 104 may be awaiting an indication from the service provider computing system 102 regarding whether approval has been received from an approver device 106. In some implementations, the indication is provided in response to a view-payment API call from the client computing system 104 to the service provider computing system 102. If the status has changed (e.g., approved or rejected), the client computing system 104 may transmit an indication to the submitter device 106 and the client application may revise the value in the corresponding status field of GUI 900. In various implementations, a status of "scheduled" may indicate that an approved payment is in process by the service provider computing system 102.

A status of "not submitted" may indicate that a payment may be submitted for approval (i.e., is eligible for submission) but has not been submitted. In various implementations, a payment is submittable if the corresponding payment account (with which the payment is associated) is administered by the service provider computing system 102 or has otherwise been registered for the payment API service of the service provider computing system 102. In example GUI 900, "Basic Checking . . . 1234" is an account eligible for payment submission via a payment API service integrated with the client application. By contrast, in some implementations, a payment with a status of "not paid" or "paid" may be for payments with a corresponding payment account that is not administered by the service provider computing system 102 or has otherwise not been registered for the payment API service of the service provider computing system 102. In example GUI 900, "Bus Credit Card . . . 1234" is an account not eligible for payment submission via a payment API service integrated with the client application. In some implementations, a user may make a payment separately via an application or website of the service provider computing system 102 (or a financial institution computing system of another entity) and update the status for the payment (to, e.g., "paid") once paid.

In various implementations, GUI 900 running on a submitter device 106 provides activatable link 920 for submitting selected payments for approval. For example, the payment associated with "Invoice 130" (the second row of payments) may be selected (by, e.g., clicking on the square at the far left of the second row), and link 920 may be selected to submit the payment. The client application may transmit the request for submission to the client computing system 104, with an identification of the payment to be submitted. The client computing system 104 may then make a submit-payment API call to the service provider computing system 102 as discussed.

Figure 10:
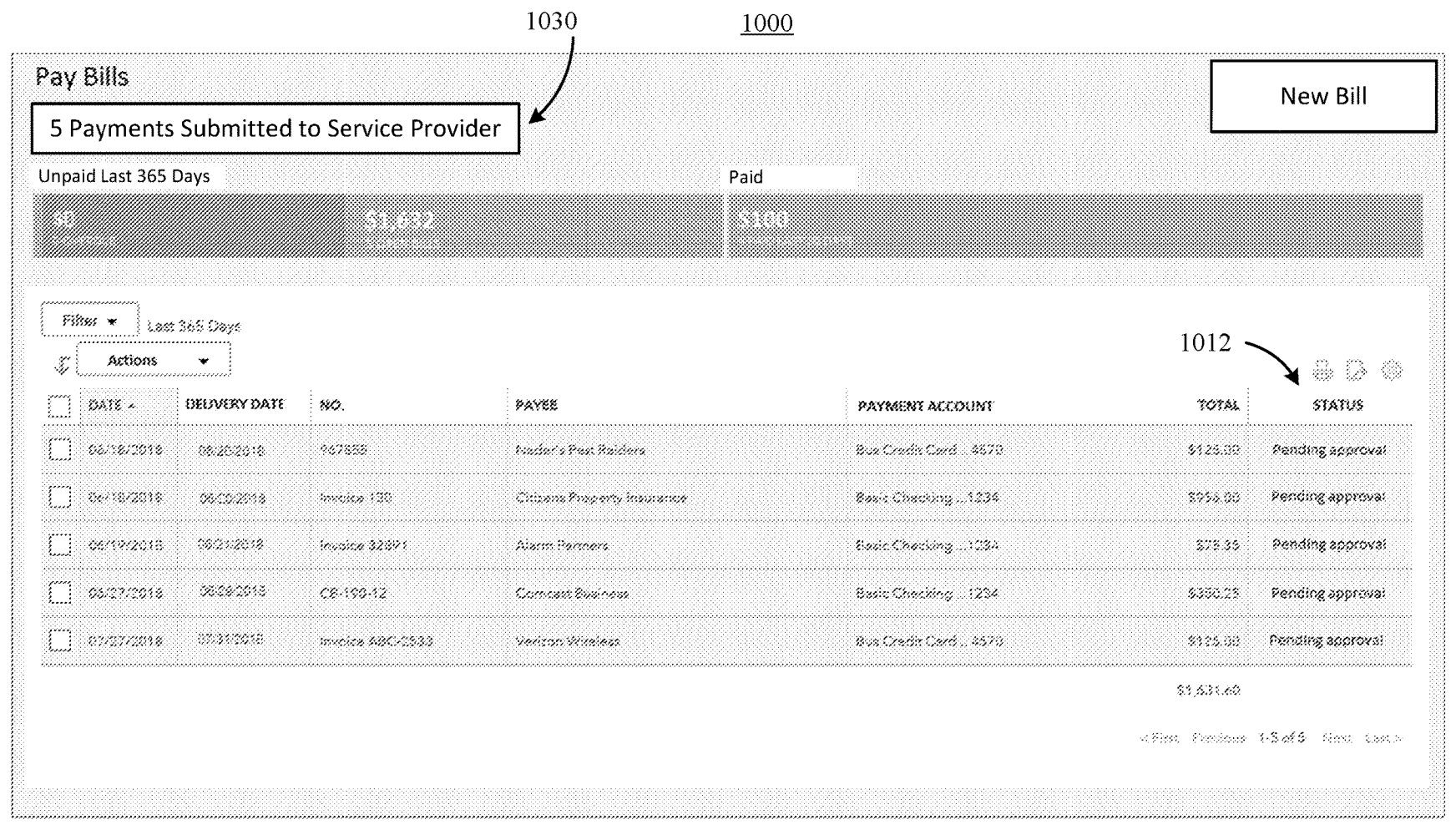

Referring to GUI 1000 depicted in FIG. 10, in certain implementations, the client application may indicate via an action indicator 1030 that certain payments have been submitted to the service provider computing system 102 for approval. In various implementations, the client application running on the submitter device 106 changes the values in corresponding status fields 1012. In GUI 1000, approval has been requested for the five payments shown, as indicated by the "pending approval" statuses.

Figure 11:
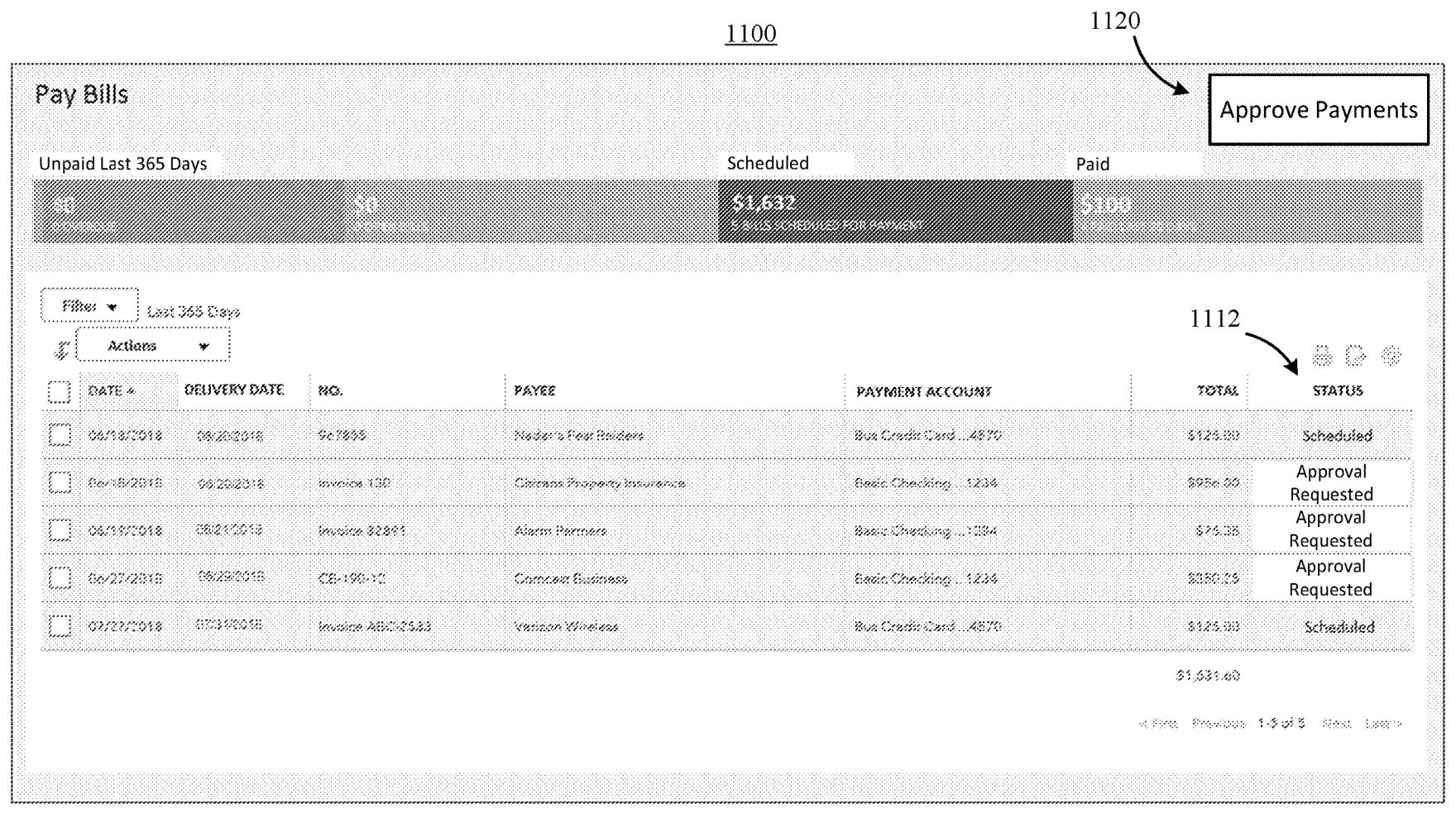

Referring to GUI 1100 depicted in FIG. 11, in certain implementations, the client application may provide information on payments and allow for approval of payments via the client application. In various implementations, the client application running on an approver device 106 may be notified by the client computing system 104 that approval has been requested for one or more payments. The client application may then change the values in corresponding status fields 1112. In GUI 1100, approval has been requested for the third, fourth, and fifth payments, as indicated by the "approval requested" statuses. One or more of the payments may be selected (by, e.g., clicking on the square at the far left of the corresponding rows), and link 1120 may be selected to approve the selected payments. The client application may transmit the approval to the client computing system 104, with an identification of the approved payments. The client computing system 104 may then transmit the approval to the service provider computing system 102, which may then initiate or otherwise schedule a payment. In other implementations, approval may be provided outside of the client application (e.g., via a website or application of the service provider computing system 102 as discussed).

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing device comprising:
   a network interface configured to communicate data with a client computing system via a telecommunications network;
   one or more user interfaces configured to receive inputs and visually present graphical user interfaces (GUIs); and
   a processor and a memory having stored thereon a client application that is provided by the client computing system, the client application configured to present a visually-perceptible active link that allows a user to access at least one of a plurality of APIs from within the client application to initiate API calls to and from an external service provider computing system, the client application configured to cause the processor to:
   present, via the one or more user interfaces, the GUI requesting information on the set of one or more payments to be processed by an external service provider computing system;
   accept from a first user, via the one or more user interfaces, the requested information on the set of payments;
   present, via the one or more user interfaces, the visually-perceptible active link that is activatable using the one or more user interfaces to submit the set of payments for approval via the computing device or a second computing device;
   receive a signal from the one or more user interfaces indicating activation of the link;
   in response to receiving the signal, transmit, via the network interface, a first command to the client computing system commanding the client computing system to make a submit-payment application programming interface (API) call to the external service provider computing system and to accompany the submit-payment API call with a security token that:
   (i) is generated by and received from the external service provider computer system;
   (ii) is associated with the client computing system and at least one of the first user or a second user who is registered with the external service provider computing system as having payment approval rights;
   (iii) identifies the client computing system and indicates that the client computing system is authorized to submit API calls to the external service provider computing system via an API gateway; and
   (iv) includes login credentials used by the at least one of the first user or the second user to enable the external service provider computing system to process the set of payments, wherein:
   the client application is configured to cause the client computing system to make the submit-payment API call without interacting with an operating environment of an application or website of the external service provider computing system that processes the payments, and
   the submit-payment API call causes the set of payments to be made available for approval, via the computing device or the second computing device, by a user who is registered with the external service provider computing system as having payment approval rights;
   present, via the one or more user interfaces, a visually-perceptible display element indicating that the set of payments has been submitted for approval; and
   present, via the one or more user interfaces, a second visually-perceptible display element indicating that the set of payments has been approved.

2. The computing device of claim 1, wherein the client application is further configured to cause the processor to:
   transmit, via the network interface, a second command to the client computing system commanding the client computing system to make a view-payment API call to the external service provider computing system, wherein the view-payment API call includes the security token; and
   receive, directly from the external service provider computing system via the network interface, and in response to the view-payment API call of the client computing system to the external service provider computing system, a status that approval was received at the external service provider computing system from the computing device or the second computing device.

3. The computing device of claim 1, wherein the client application is further configured to cause the processor to present a second visually-perceptible active link that is activatable using the one or more user interfaces to approve the set of payments.

4. The computing device of claim 3, wherein in response to selection of the second visually-perceptible active link, the client application is further configured to cause the processor to direct a browser running on the first device or the second device to a uniform resource locator (URL) that indicates approval or rejection to the service provider computing system.

5. The computing device of claim 1, wherein the submit-payment API call includes a payment identifier that may be cross-referenced by the external service provider computing system to determine the payment with which the identifier corresponds.

6. The computing device of claim 1, wherein the security token was generated by the external service provider computing system and transmitted to the client computing system following enrollment by the first user or the second user in a payment service provided by the external service provider computing system.

7. The computing device of claim 1, wherein approval is received at the service provider computing system from the computing device or the second computing device of the second user.

8. The computing device of claim 1, wherein the client application is at least one of a native application running on the computing device and a web application executed in a web browser running on the computing device.

9. The computing device of claim 1, wherein the GUI presented by the client application includes a set of fields into which the first user enters the requested information via the one or more user interfaces of the computing device.

10. The computing device of claim 1, wherein the client application is further configured to:
    present a second visually-perceptible active link that is activatable using the one or more user interfaces to cancel a selected payment;
    receive a second signal from the one or more user interfaces indicating activation of the second link; and
    in response to receiving the second signal, and without using an application provided by the external service provider computing system or directing the computing device to a website provided by the external service provider computing system, cause the client computing system to make a cancel-payment API call to the external service provider computing system, wherein the cancel-payment API call includes the security token and an identification of the selected payment.

11. A method implemented by a computing device, the method comprising:
    receiving, via a network interface through a telecommunications network, from a client computing system, a client application, the client application configured to present a visually-perceptible active link that allows a user to access at least one of a plurality of APIs from within the client application to initiate API calls to and from an external service provider computing system;
    presenting, via one or more user interfaces, the GUI of the client application, the GUI requesting information on the set of one or more payments to be processed by the external service provider computing system;
    accepting from a first user, via the one or more user interfaces, the requested information on the set of payments;
    transmitting, via the network interface through the telecommunications network, the information to the client computing system;
    presenting, via the one or more user interfaces, the visually-perceptible active link that is activatable using the one or more user interfaces to submit the set of payments for approval via the computing device or a second computing device;
    receiving a signal from the one or more user interfaces indicating activation of the link;
    in response to receiving the signal, transmitting, via the network interface, a first command to the client computing system commanding the client computing system to make a submit-payment application programming interface (API) call to the external service provider computing system and to accompany the submit-payment API call with a security token that:
    (i) is generated by and received from the external service provider computer system;
    (ii) is unique to the client computing system and at least one of the first user or a second user who is registered with the external service provider computing system as having payment approval rights;
    (iii) identifies the client computing system and indicates that the client computing system is authorized to submit API calls to the external service provider computing system via an API gateway; and
    (iv) includes login credentials used by the at least one of the first user or the second user to enable the external service provider computing system to process the set of payments, wherein:
       the set of payments are submitted for approval from within an operating environment of the client application without interacting with an operating environment of an application or website of the external service provider computing system that processes the payments, and
       the submit-payment API call causes the set of payments to be made available for approval, via the computing device or the second computing device, by a user who is registered with the external service provider computing system as having payment approval rights;
    presenting, via the one or more user interfaces, a visually-perceptible display element indicating that the set of payments has been submitted for approval; and
    presenting, via the one or more user interfaces, a second visually-perceptible display element indicating that the set of payments has been approved.

12. The method of claim 11, wherein the client computing system makes the submit-payment API call without using an application or website provided by the external service provider computing system.

13. The method of claim 11, further comprising:
    transmitting, via the network interface, a second command to the client computing system commanding the client computing system to make a view-payment API call to the external service provider computing system, wherein the view-payment API call includes the security token; and
    receiving, directly from the external service provider computing system via the network interface, and in response to the view-payment API call of the client computing system to the external service provider computing system, a status that approval was received at the external service provider computing system from the computing device or the second computing device.

14. The method of claim 11, further comprising presenting a second visually-perceptible active link that is activatable using the one or more user interfaces to approve the set of payments.

15. The method of claim 14, further comprising causing the processor to direct a browser running on the first device or the second device to a uniform resource locator (URL) that indicates approval or rejection to the service provider computing system in response to selection of the second visually-perceptible active link.

16. The method of claim 11, wherein the submit-payment API call includes a payment identifier that may be cross-referenced by the external service provider computing system to determine the payment with which the identifier corresponds.

17. The method of claim 11, wherein the GUI presented by the client application includes a set of fields into which the first user enters the requested information via the one or more user interfaces of the computing device.

18. The method of claim 11, further comprising:
presenting a second visually-perceptible active link that is activatable using the one or more user interfaces to cancel a selected payment;
receiving a second signal from the one or more user interfaces indicating activation of the second link; and
in response to receiving the second signal, and without using an application provided by the external service provider computing system or directing the computing device to a website provided by the external service provider computing system, causing the client computing system to make a cancel-payment API call to the external service provider computing system, wherein the cancel-payment API call includes the security token and an identification of the selected payment.

19. The method of claim 11, wherein the security token was generated by the external service provider computing system and transmitted to the client computing system following enrollment by the first user or the second user in a payment service provided by the external service provider computing system.

20. A client computing system comprising:
a network interface configured to communicate data with a first computing device, a second computing device, and an external service provider computing system via a telecommunications network; and
a processor and a memory having stored thereon instructions configured to cause the processor to:
provide a client application to the first computing device, the client application configured to present a first visually-perceptible link that allows a user to access at least one of a plurality of APIs from within the client application;
receive, from the external service provider computing system via the network interface, a security token generated by the external service provider computing system and transmitted to the client computing system following approval of a request to integrate payment functionality provided by the external service provider computing system into a client application, wherein the security token:
(i) is unique to the client computing system and at least one of a first user or a second user who is registered with the external service provider computing system as having payment approval rights;
(ii) identifies the client computing system and indicates that the client computing system is authorized to submit API calls to the external service provider computing system via an API gateway; and
(iii) includes login credentials used by the at least one of the first user or the second user to enable the external service provider computing system to process the set of payments;
receive, from the first computing device running the client application, through the network interface, information on a set of one or more payments to be made using funds administered by the external service provider computing system, wherein the client application receives the information via the GUI requesting the information;
receive, through the network interface, a first indication from the first computing device that the set of payments is to be submitted for approval, wherein the first indication is transmitted by the first computing device to the client computing system in response to activation of the visually-perceptible link, the link being activatable via one or more user interfaces of the first computing device to submit the set of payments for approval via the first computing device or the second computing device;
in response to receiving the first indication, transmit, via the network interface, a submit-payment (API) call to the external service provider computing system along with the security token, wherein the submit-payment API call causes the set of payments to be made available for approval, via the first computing device or the second computing device, by a user who is registered with the external service provider computing system as having payment approval rights;
transmit, via the network interface, to the first computing device, a confirmation that the set of payments have been submitted to the external service provider computing system for approval, wherein the client application is configured to cause the client computing system to make the submit-payment API call without interacting with an operating environment of an application or website of the external service provider computing system.

* * * * *